(12) United States Patent
Hall

(10) Patent No.: US 12,428,987 B1
(45) Date of Patent: Sep. 30, 2025

(54) BIOCHAR SYSTEM AND METHOD IN STOICHIOMETRIC EXHAUST GAS RECIRCULATION POWER PLANT

(71) Applicant: GE Infrastructure Technology LLC, Greenville, SC (US)

(72) Inventor: Joel Meador Hall, Simpsonville, SC (US)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/771,220

(22) Filed: Jul. 12, 2024

(51) Int. Cl.
*F02C 3/28* (2006.01)
*C10J 3/72* (2006.01)
*F02M 26/34* (2016.01)
*F02M 26/35* (2016.01)

(52) U.S. Cl.
CPC ............. *F02C 3/28* (2013.01); *C10J 3/723* (2013.01); *F02M 26/34* (2016.02); *F02M 26/35* (2016.02); *C10J 2300/0916* (2013.01); *C10J 2300/1253* (2013.01); *C10J 2300/1637* (2013.01); *C10J 2300/165* (2013.01); *C10J 2300/1675* (2013.01); *C10J 2300/1687* (2013.01); *C10J 2300/1823* (2013.01); *C10J 2300/1876* (2013.01)

(58) Field of Classification Search
CPC ..... F02C 6/00; F02C 6/18; F02C 3/28; F02M 26/34; F02M 26/35; C10J 3/723; C10J 2300/0916; C10J 2300/1253; C10J 2300/1637; C10J 2300/165; C10J 2300/1675; C10J 2300/1687; C10J 2300/1823; C10J 2300/1876
See application file for complete search history.

(56) References Cited

U.S. PATENT DOCUMENTS

| | | | |
|---|---|---|---|
| 4,503,681 A | 3/1985 | Willyyoung et al. | |
| 4,915,921 A | 4/1990 | Richter et al. | |
| 10,280,377 B1* | 5/2019 | Nestler | F01K 23/067 |
| 2010/0275514 A1 | 11/2010 | Paganessi et al. | |
| 2011/0070628 A1 | 3/2011 | Hornung et al. | |
| 2011/0088320 A1 | 4/2011 | Dietenberger et al. | |
| 2013/0026419 A1 | 1/2013 | Song et al. | |
| 2014/0123624 A1* | 5/2014 | Minto | F23N 1/00 60/39.281 |

(Continued)

OTHER PUBLICATIONS

PCT Invitation to Pay Fees-Office Action; International Searching Authority (Form PCT/ISA/206); Application No. PCT/US2024/037771 dated Sep. 23, 2024; 2 pages.

(Continued)

*Primary Examiner* — Steven M Sutherland
(74) *Attorney, Agent, or Firm* — Fletcher Yoder, P.C.

(57) ABSTRACT

A system includes a gas turbine system having a compressor, a combustor, and a turbine, wherein the combustor is configured to combust fuel and oxidant in a substantially stoichiometric equivalence ratio, phi ($\phi$), of between 0.95 to 1.05. The system further includes an exhaust gas recirculation (EGR) system configured to recirculate an exhaust gas from the turbine to an intake into the compressor. The system further includes a biochar pyrolysis reactor configured to heat a biomass feedstock to cause a pyrolysis reaction of the biomass feedstock using heat from the exhaust gas to generate a biochar and a syngas.

22 Claims, 9 Drawing Sheets

(56) References Cited

U.S. PATENT DOCUMENTS

2020/0271050 A1* 8/2020 Dunn .................. F01N 3/005

OTHER PUBLICATIONS

Fantozzi, Francesco et al., "Assessment of the Energy Conversion of Whole Oil Fruits with a Pyrolysis and Gas Turbine Process", Proceedings of ASME Turbo Expo 2010: Power for Land, Sea and Air, GT2010, Jun. 14-18, 2010, Glasgow, UK, GT2010-23584, 9 pages.

PCT International Search Report and Written Opinion; Application No. PCT/US2024/037771; dated Nov. 26, 2024; 17 pages.

Anthonysamy, Shahreen Izwan et al., "Dynamic Adsorption of Nitric Oxide (NO) in a Fixed-bed Reactor Using Rubber Seed Shell-derived Biochar", Biointerface Research in Applied Chemistry, Platinum Open Access Journal (ISSN:2069-5837), vol. 12, Issue 2, 2022, pp. 1638-1650.

Mohamed, Ghada Osama, et al., "Using biochar to control nitric oxide air pollution", International Conference on Chemical and Environmental Engineering (ICEE-11), IOP Publishing, Journal of Physics: Conference Series, 2305 (2022) 012029, doi: 10.1088/1742-6596/2305/1/012029, 21 pages.

Wang, Yan et al., Oxidation absorption of nitric oxide from flue gas using biochar-activated peroxydisulfate technology, ELSEVIER, Fuel 337 (2023) 127189, School of Energy and Power Engineering, Jiangsu University, Zhenjiang 212013, China, www.elsevier.com/locate/fuel, Dec. 22, 2022, 9 pgs.

* cited by examiner

BIOCHAR SYSTEM AND METHOD IN STOICHIOMETRIC EXHAUST GAS RECIRCULATION POWER PLANT

BACKGROUND

The present application relates generally to a system and method for heat integration with a biochar system in a power plant.

An industrial plant, such as a combustion-driven power plant, may produce a variety of gases, such as an exhaust gas of a combustion system. The combustion system may include a gas turbine engine, a reciprocating piston-cylinder engine, a furnace, a boiler, or other industrial equipment. These exhaust gases may include one or more undesirable gases, such as acid gases and/or greenhouse gases. For example, the undesirable gases may include carbon oxides ($CO_X$) such as carbon dioxide ($CO_2$) and carbon monoxide (CO), nitrogen oxides ($NO_X$) such as nitrogen dioxide ($NO_2$), and/or sulfur oxides ($SO_X$) such as sulfur dioxide ($SO_2$). Specifically, $NO_X$ are considered acid gases, and they may react with water in the atmosphere and form acids such as nitric acid ($HNO_3$) and nitrous acid ($HNO_2$). These acids may contribute to acid rain, which can have detrimental effects on ecosystems, making $NO_X$ a significant environmental concern. While $NO_X$ are not typically classified as considered greenhouse gases, they may indirectly contribute to the greenhouse effect. For example, through various atmospheric reactions, $NO_X$ may lead to the production of nitrous oxide ($N_2O$), which is a potent greenhouse gas with a global warming potential much greater than that of $CO_2$ over a 100-year period. As a further example, $NO_X$ may contribute to the formation of ground-level ozone, which is a harmful air pollutant and a key component of smog. With various regulations and environmental concerns public well-being and global warming, it would be desirable to reduce the output of undesirable gases (e.g., $NO_X$) into the atmosphere, particularly for hydrocarbon fuel consuming equipment, such as combustion systems.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes a gas turbine system having a compressor, a combustor, and a turbine, wherein the combustor is configured to combust fuel and oxidant in a substantially stoichiometric equivalence ratio, phi ($\phi$), of between 0.95 to 1.05. The system further includes an exhaust gas recirculation (EGR) system configured to recirculate an exhaust gas from the turbine to an intake into the compressor. The system further includes a biochar pyrolysis reactor configured to heat a biomass feedstock to cause a pyrolysis reaction of the biomass feedstock using heat from the exhaust gas to generate a biochar and a syngas.

In certain embodiments, a method includes combusting fuel with oxidant in a substantially stoichiometric equivalence ratio, phi ($\phi$), of between 0.95 to 1.05 in a combustor of a gas turbine system, wherein the gas turbine system includes a compressor, the combustor, and a turbine. The method further includes recirculating an exhaust gas from the turbine to an intake into the compressor via an exhaust gas recirculation (EGR) system. The method further includes heating a biomass feedstock in a biochar pyrolysis reactor to cause a pyrolysis reaction of the biomass feedstock using heat from the exhaust gas to generate a biochar and a syngas.

In certain embodiments, a system includes a controller having a processor, a memory, and instructions stored on the memory and executable by the processor to control combustion of fuel with oxidant in a substantially stoichiometric equivalence ratio, phi ($\phi$), of between 0.95 to 1.05 in a combustor of a gas turbine system, wherein the gas turbine system includes a compressor, the combustor, and a turbine. The controller is further configured to control recirculation of an exhaust gas from the turbine to an intake into the compressor via an exhaust gas recirculation (EGR) system. The controller is further configured to control heating of a biomass feedstock in a biochar pyrolysis reactor to cause a pyrolysis reaction of the biomass feedstock using heat from the exhaust gas to generate a biochar and a syngas.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
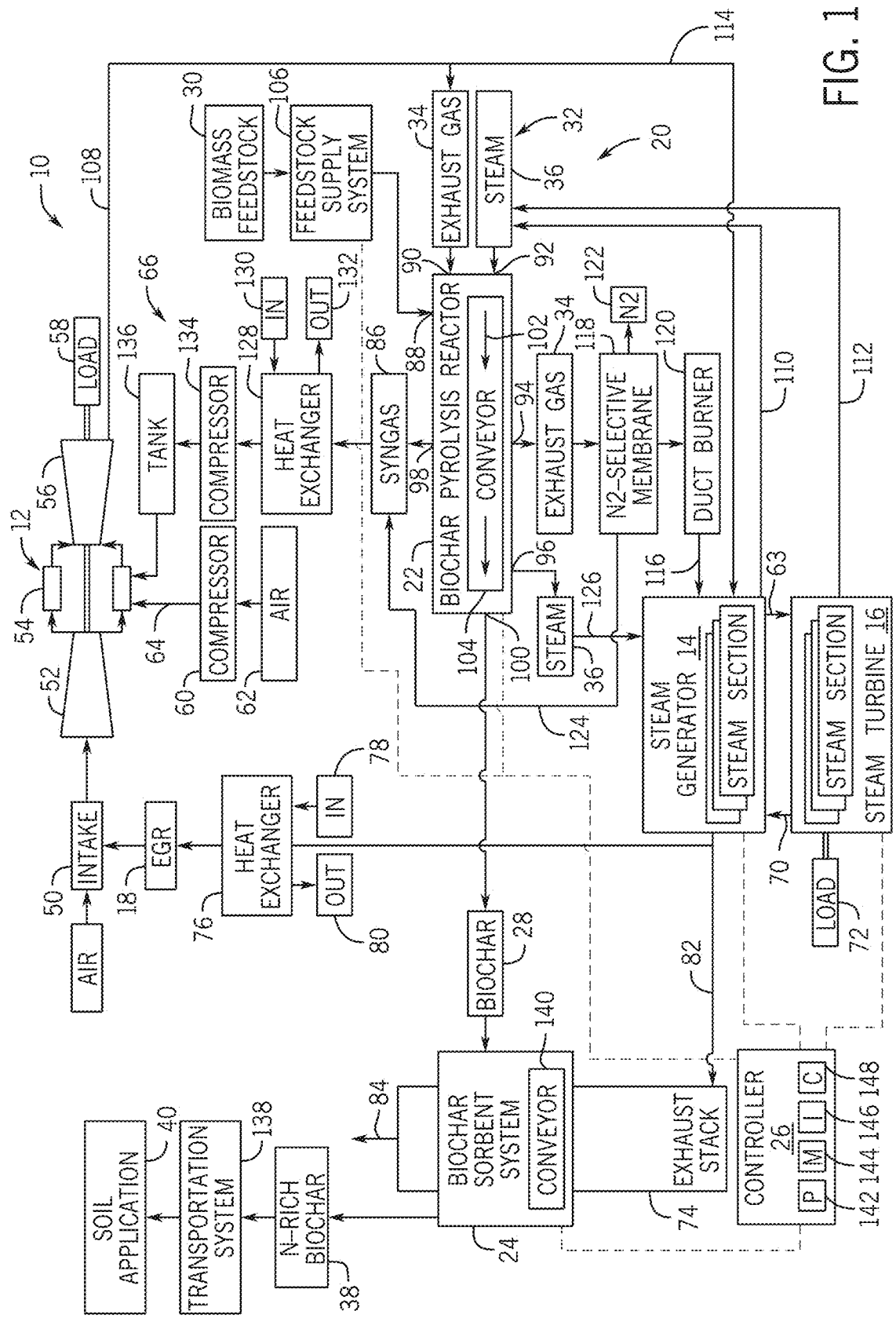
FIG. 1 is a block diagram of an embodiment of a power plant in a combined cycle configuration having a gas turbine system, a steam generator, a steam turbine system, an exhaust gas recirculation (EGR) system, and a biochar system having a biochar pyrolysis reactor and a biochar sorbent system.

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for heat integration with an industrial plant, such as a combustion-driven power plant, using available heat for biochar production and using biochar for exhaust gas treatment. In certain embodiments, the disclosed embodiments provide a biochar system having a biochar pyrolysis reactor and/or a biochar sorbent system. The biochar pyrolysis reactor is configured to receive a biomass feedstock and use one or more available heat sources (e.g., exhaust gas and/or steam) in the power plant to drive a pyrolysis reaction of the biomass feedstock, thereby generating both syngas as a fuel source for the power plant and also biochar for various uses on site and/or off-site. For example, the biochar may be used off-site for various soil applications and/or on-site as a sorbent material in the biochar sorbent system. In certain embodiments, the biochar sorbent system uses biochar (e.g., produced on-site or off-site by a biochar pyrolysis reactor and/or other biochar sources) as a sorbent material to adsorb undesirable gases (e.g., $NO_X$) from the exhaust gas, thereby producing a treated gas lean in the undesirable gases (e.g., $NO_X$-lean exhaust gas) and a nitrogen-rich biochar for use in various soil applications. In certain embodiments, the power plant may employ only the biochar pyrolysis reactor, only the biochar sorbent system, or a combination thereof, as the biochar system. Additionally, in certain embodiments, the power plant may include a gas turbine system operating in a simple cycle or in a combined cycle with a steam generator and steam turbine system. Additionally, in certain embodiments, the power plant may include or exclude exhaust gas recirculation. Finally, the power plant may be configured to operate in a variety of fuel-lean, fuel-rich, or stoichiometric operating modes, as well as different $NO_X$ modes (e.g., low $NO_X$, intermediate $NO_X$, or high $NO_X$), in combination with the biochar system that benefits from the $NO_X$ (e.g., adsorbs into biochar) and helps reduce the $NO_X$ in the exhaust gas. Accordingly, the disclosed embodiments include various control schemes to enable more flexibility in operating the power plant, while using the biochar system for $NO_X$ reduction and nitrogen-rich biochar production to benefit the environment. The following discussion presents various aspects of the biochar system in context of a power plant; however, the biochar system is intended for use in any plant or application having available heat and exhaust gas/flue gas needing treatment.

FIG. 1 is a block diagram of an embodiment of a power plant 10 in a combined cycle configuration having a gas turbine system 12, a steam generator 14 (e.g., a heat recovery steam generator (HRSG)), a steam turbine system 16, an exhaust gas recirculation (EGR) system 18, a biochar system 20 having one or more biochar pyrolysis reactors 22 and one or more biochar sorbent systems 24, and a controller 26 coupled to each of the systems 12, 14, 16, 18, 20, 22, and 24. As discussed below, the one or more biochar pyrolysis reactors 22 of the biochar system 20 are configured to generate a biochar 28 by adding heat to a biomass feedstock 30 using one or more heat transfer fluids or heat sources 32 (e.g., exhaust gas 34 and/or steam 36) from the power plant 10. The biomass feedstock 30 may include, for example, industrial waste and co-products, food waste, agricultural residues (e.g., straw), plants (e.g., maize, switchgrass, miscanthus and bamboo), energy crops, wood, wood residues, or any combination thereof, in a variety of forms (e.g., pellets). Additionally, as discussed below, the biochar sorbent system 24 is configured to use the biochar 28 as a sorbent material to adsorb undesirable gases, such as nitrogen oxides ($NO_X$), from the exhaust gas 34, thereby reducing emissions of the undesirable gases in the exhaust gas 34 while simultaneously enriching the biochar 28 with nitrogen to generate nitrogen-rich biochar 38 for various soil applications 40 (e.g., agriculture, forestry, farming, etc.). Various aspects of the biochar system 20 and configurations of the power plant 10 are discussed in further detail below.

The gas turbine system 12 includes an air intake 50, a compressor 52 having one or more compressor stages, one or more combustors 54, a turbine 56 having one or more turbine stages, and a load 58 (e.g., electrical generator) driven by the turbine 56. In certain embodiments, the gas turbine system 12 further includes an exhaust gas recirculation (EGR) system 18 configured to recirculate the exhaust gas 34 into the air intake 50. The recirculated exhaust gas 34 helps to reduce the temperature and formation of certain emissions (e.g., nitrogen oxides ($NO_X$)) associated with combustion in the combustors 54. In operation, the compressor 52 receives air (and also exhaust gas 34 if the EGR system 18 is active) from the air intake 50, and compresses the air and/or exhaust gas 34 in one or more compressor stages (e.g., stages of rotating compressor blades). In certain embodiments, such as embodiments with the EGR system 18, the gas turbine system 12 includes an air compressor 60 configured to compress air 62 and supply a compressed air 64 to the combustors 54 separate from the compressor 52. The air compressor 60 may be driven by a shaft of the gas turbine system 12 or independently driven by another power source, such as an electric motor or a combustion engine. The combustors 54 then combust fuel from a fuel supply system 66 with the compressed air and/or exhaust gas, and generate hot combustion gases. The hot combustion gases expand and drive one or more turbine stages (e.g., stages of rotating turbine blades) in the turbine 56, thereby driving rotation of the compressor 52 and the load 58 via shafts. The turbine 56 then outputs the hot combustion gases as the exhaust gas 34.

The steam generator 14 recovers heat from the exhaust gas 34 to generate steam 68 for driving the steam turbine system 16. The steam generator 14 may include one or more different steam pressure sections, such as one or more of a high-pressure (HP) steam section, an intermediate-steam (IP) section, and a low-pressure (LP) steam section configured to generate HP steam, IP steam, and LP steam. However, the steam generator 14 is not limited to any particular number or configuration of different steam pressure sections. Similarly, the steam turbine system 16 may include one or more different steam turbine sections, such as one or more of an HP steam turbine driven by the HP steam, an IP steam turbine driven by the IP steam, and a LP steam turbine driven by the LP steam. However, the steam turbine system 16 is not limited to any particular number or configuration of different steam turbine sections. In addition to the steam 68 provided by the steam generator 14, the steam turbine system 16 may return any remaining steam/water as a return flow 70 to the steam generator 14. In operation, the steam turbine system 16 drives a load 72 (e.g., electrical generator) via a shaft. In certain embodiments, the steam turbine system 16 and/or the steam generator 14 may provide heated water and/or steam 36 (e.g., HP steam, IP steam, and/or LP steam) to the biochar pyrolysis reactor 22 of the biochar system 20 to support pyrolysis of the biomass feedstock 30 to generate the biochar 28.

After the steam generator 14, the exhaust gas 34 may flow to the EGR system 18 and/or an exhaust stack 74. In embodiments including the EGR system 18, at least a portion of the exhaust gas 34 may flow through a heat exchanger 76 (e.g., EGR cooler) configured to cool the exhaust gas 34 prior to recirculation through the gas turbine system 12 via the air intake 50. For example, the heat exchanger 76 may indirectly transfer heat away from the exhaust gas 34 to a thermal fluid (e.g., water) circulated through the heat exchanger 76 from a fluid input 78 to a fluid output 80, wherein the thermal fluid discharged from the fluid output 78 may be used for heating elsewhere in the power plant 10, district heating applications, combined heat and power (CHP) applications, or any combination thereof. In embodiments with or without the EGR system 18, at least a portion or all of the exhaust gas 34 may flow along an exhaust flow path 82 having the exhaust stack 74, wherein the biochar sorbent system 24 is configured to treat the exhaust gas 34 along the exhaust flow path 82 (e.g., within the exhaust stack 74) before discharging a treated gas 84 into the atmosphere. As discussed in further detail below, the biochar sorbent system 24 receives the biochar 28 from the biochar pyrolysis reactor 22 using the heat sources 36 from the power plant 10, and then the biochar sorbent system 24 uses the biochar 28 to remove undesirable gases, such as nitrogen oxides ($NO_x$), from the exhaust gas 34 to output the treated gas 84 from the exhaust stack 74 and the nitrogen-rich biochar 38 for use in various soil applications 40. The biochar sorbent system 24 will be discussed in further detail below after discussing the biochar pyrolysis reactor 22.

In the illustrated embodiment, the biochar system 20 includes one or more of the biochar pyrolysis reactors 22 to generate the biochar 28 and a syngas 86 using the biomass feedstock 30 and the one or more heat sources 32 (e.g., exhaust gas 34 and/or steam 36) integrally provided during operation of the power plant 10. In certain embodiments, the biochar system 20 may include a single biochar pyrolysis reactor 22 using only one or multiple of the heat sources 32, such as only the exhaust gas 34, only the steam 36, or a combination of both the exhaust gas 34 and the steam 36. In certain embodiments, the biochar system 20 may include a plurality of biochar pyrolysis reactors 22 operating in a series configuration, a parallel configuration, or a combination thereof, wherein each of the biochar pyrolysis reactors 22 may operate with the same or different heat sources 32. In certain embodiments, the biochar pyrolysis reactor 22 may include a reactor vessel having a metal casing, an insulated interior lining (e.g., ceramic lining), a feedstock inlet 88, an exhaust gas inlet 90, a steam inlet 92, an exhaust gas outlet 94, a steam outlet 96, a syngas outlet 98, a biochar outlet 100, and an internal flow path 102 along a conveyor 104 through the biochar pyrolysis reactor 22. In general, the biochar pyrolysis reactor 22 is configured to transfer heat (e.g., directly and/or indirectly) from the heated fluids (e.g., exhaust gas 34 and/or steam 36) from the heat sources 32 to the biomass feedstock 30 for a sufficient residence time and temperature inside of the biochar pyrolysis reactor 22 to cause a pyrolysis reaction of the biomass feedstock 30, thereby generating the biochar 28 and the syngas 86. Various aspects of the biochar system 20 can be controlled by the controller 26 to control the pyrolysis reaction and characteristics of the biochar 28 and the syngas 86.

The biochar pyrolysis reactor 22 is configured to receive the biomass feedstock 30 from a feedstock supply system 106 through the feedstock inlet 88, and move the biomass feedstock 30 along the internal flow path 102 through the biochar pyrolysis reactor 22 to the biochar outlet 100 via the conveyor 104. The feedstock supply system 106 may include an electric motor driven external conveyor, such as a belt conveyor, a screw conveyor or auger conveyor, a hopper, or any combination thereof. Similarly, the conveyor 104 may include an electric motor driven internal conveyor, such as a belt conveyor, a screw conveyor or auger conveyor, a gravity driven conveyor with an incline, or any combination thereof. The controller 26 is configured to control the speed (e.g., increase or decrease speed) of the feedstock supply system 106 and the conveyor 104 to control the residence time for the pyrolysis reaction inside of the biochar pyrolysis reactor 22, thereby controlling characteristics of the biochar 28 and the syngas 86.

The biochar pyrolysis reactor 22 is configured to receive one or more heated fluids from the heat sources 32 (e.g., exhaust gas 34 and/or steam 36) through the exhaust gas inlet 90 and/or the steam inlet 92 and direct the heated fluids to transfer heat (e.g., direct and/or indirect heat transfer) to the biomass feedstock 30 moving along the conveyor 104, such as in a flow direction parallel to and along a conveyor direction of the conveyor 104, a flow direction parallel to and opposite from the conveyor direction of the conveyor 104, and/or a flow direction crosswise to the conveyor direction of the conveyor 104. For example, the biomass feedstock 30 may be directly exposed to the heated fluids (e.g., exhaust gas 34 and/or steam 36) for direct heat transfer, or the heated fluids (e.g., exhaust gas 34 and/or steam 36) may flow through one or more conduits, hollow walls, or heat exchangers coupled to and/or within the biochar pyrolysis reactor 22 for indirect heat transfer to the biomass feedstock 30. The heated fluids (e.g., exhaust gas 34 and/or steam 36), after flowing through the biochar pyrolysis reactor 22 and transferring heat to the biomass feedstock 30 on the conveyor 104, then discharge through the exhaust gas outlet 94 and the steam outlet 96. Inside the biochar pyrolysis reactor 22, the heat transferred from the heated fluids (e.g., exhaust gas 34 and/or steam 36) to the biomass feedstock 30 causes the pyrolysis reaction of the biomass feedstock 30, thereby generating both the biochar 28 and the syngas 86. The fluid characteristics (e.g., temperature, pressure, flow rate, etc.) of the heated fluids (e.g., exhaust gas 34 and/or steam 36) can vary the pyrolysis reaction of the biomass feedstock 30. Accordingly, the controller 26 is configured to control the fluid characteristics (e.g., temperature, pressure, flow rate, etc.) of the heated fluids (e.g., exhaust gas 34 and/or steam 36) to control the pyrolysis reaction inside of the biochar pyrolysis reactor 22, thereby controlling characteristics of the biochar 28 and the syngas 86.

In certain embodiments, the controller 26 is configured to control the speed of the feedstock supply system 106 and the conveyor 104, the fluid characteristics (e.g., temperature, pressure, flow rate, etc.) of the heated fluids (e.g., exhaust gas 34 and/or steam 36), or a combination thereof, based on sensor feedback and an operating mode of the power plant 10. For example, the sensor feedback may include feedback from one or more sensors inside of the biochar pyrolysis reactor 22, such as temperature sensors, flow rate sensors, pressure sensors, gas composition sensors, optical sensors, or any combination thereof, providing sensor feedback about the pyrolysis reaction. By further example, the sensor feedback may include feedback from one or more sensors coupled to the gas turbine system 12 and/or along an exhaust gas flow path of the exhaust gas 34, such as temperature sensors, pressure sensors, flow rate sensors, gas composition sensors, or any combination thereof, providing sensor feedback about the exhaust gas 34. By further example, the sensor feedback may include feedback from one or more sensors coupled to the steam generator 14, the steam turbine system 16, and/or along a steam flow path of the steam 36, such as temperature sensors, pressure sensors, flow rate sensors, or any combination thereof, providing sensor feedback about the steam 36. The foregoing sensor feedback about the pyrolysis reaction, the exhaust gas 34, and the steam 36 may be used to control the speed, volume, and residence time of biomass feedstock 30 moving through the biochar pyrolysis reactor 22, as well as the flow rate, temperature, and pressure of the heated fluids used to drive the pyrolysis reaction, thereby further controlling characteristics of the biochar 28 and the syngas 86.

Additionally, as discussed in further detail below, the controller 26 is configured to control the biochar system 20 based on the operating mode of the power plant 10, such as a startup mode, a steady state mode, a shutdown mode, a full load mode, or a part load mode. For example, the power plant 10 may operate in the full load mode to generate more electricity when electricity demand is high, whereas the power plant 10 may operate in the part load mode to generate less electricity when electricity demand is low. As the power plant 10 changes between the full load mode and the part load mode (or between any of the operating modes), the fluid characteristics (e.g., temperature, pressure, flow rate, etc.) of the heated fluids (e.g., exhaust gas 34 and/or steam 36) and the demand for the syngas 86 generally change, and thus the controller 26 may change the use of the heated fluids in the biochar pyrolysis reactor 22 when the power plant 10 changes between the full and part load modes, or when the power plant 10 changes between any of the operating modes.

The controller 26 is configured to control the speed of the feedstock supply system 106 and the conveyor 104 in a variety of ways depending on the sensor feedback and the operating mode of the power plant 10. For example, the controller 26 may be configured to increase the speed of the feedstock supply system 106 and the conveyor 104 to reduce a residence time of the biomass feedstock 30 within the biochar pyrolysis reactor 22, or decrease the speed of the feedstock supply system 106 and the conveyor 104 to increase the residence time of the biomass feedstock 30 within the biochar pyrolysis reactor 22. By further example, the controller 26 may be configured to increase the speed of the feedstock supply system 106 for a particular speed of the conveyor 104 to increase a volume of the biomass feedstock 30 per area on the conveyor 104 within the biochar pyrolysis reactor 22, or decrease the speed of the feedstock supply system 106 for a particular speed of the conveyor 104 to decrease the volume of the biomass feedstock 30 per area on the conveyor 104 within the biochar pyrolysis reactor 22. By further example, the controller 26 may be configured to change the speed of the feedstock supply system 106 and/or the conveyor 104 depending on the availability of heat from the heat sources 32 (e.g., exhaust gas 34 and/or steam 36).

The controller 26 is configured to control the heated fluids (e.g., exhaust gas 34 and/or steam 36) supplied to the biochar pyrolysis reactor 22 in a variety of ways depending on the sensor feedback and the operating mode of the power plant 10. For example, the controller 26 may be configured to increase the flow rate of the heated fluids (e.g., exhaust gas 34 and/or the steam 36) to increase the heat transfer from the heated fluids to the biomass feedstock 30 within the biochar pyrolysis reactor 22, or decrease the flow rate of the heated fluids (e.g., exhaust gas 34 and/or the steam 36) to decrease the heat transfer from the heated fluids to the biomass feedstock 30 within the biochar pyrolysis reactor 22. By further example, the controller 26 may be configured to change between different extraction points or sources of the heated fluids (e.g., exhaust gas 34 and/or the steam 36) to change the temperature and/or pressure of the heated fluids used to drive the pyrolysis reaction of the biomass feedstock 30 within the biochar pyrolysis reactor 22, such as by changing between different extraction points having different temperatures and/or pressures of the exhaust gas 34 and/or the steam 36. Accordingly, the controller 26 may be configured to control a valve coupled to each supply line of the heated fluids (e.g., exhaust gas 34 and/or the steam 36). In certain embodiments, the extraction points of the heated fluids (e.g., exhaust gas 34 and/or the steam 36) may include low property extraction points (e.g., low-pressure and/or low temperature), intermediate property extraction points (e.g., intermediate-pressure and/or intermediate temperature), and high property extraction points (e.g., high-pressure and/or high-temperature). The selection of the extraction points may change depending on the operating mode of the power plant 10, the demand for syngas 86, the demand for biochar 28, and/or variations in pressure and temperature at each extraction point.

In the illustrated embodiment, the biochar pyrolysis reactor 22 may receive the exhaust gas 34 via an exhaust supply line 108, the steam 36 via a steam supply line 110 coupled to the steam generator 14, the steam 36 via a steam supply line 112 coupled to the steam turbine system 16, or a combination thereof. Accordingly, the controller 26 may be configured to control a valve coupled to each of the supply lines 108, 110, and 112. In some embodiments, each of the supply lines 108, 110, and 112 may include a single supply line or a plurality of supply lines coupled to different extraction points having different properties (e.g., pressure, temperature, etc.) of the exhaust gas 34 and the steam 36. In certain embodiments, all or part of the exhaust gas 34 may bypass the biochar pyrolysis reactor 22 via an exhaust bypass line 114, which extends to the steam generator 14 to generate steam using heat from the exhaust gas 34. Again, the controller 26 may be configured to control a valve coupled to the exhaust bypass line 114 to control an amount of exhaust bypass flow along the exhaust bypass line 114.

In embodiments using at least part of the exhaust gas 34 in the biochar pyrolysis reactor 22, the exhaust gas 34 discharged from the biochar pyrolysis reactor 22 may flow through an exhaust line 116 having a nitrogen-selective membrane 118, a duct burner 120, or a combination thereof. For example, the nitrogen-selective membrane 118 and/or the duct burner 120 may be included in embodiments with direct heat transfer between the exhaust gas 34 and the biomass feedstock 30, thereby causing syngas to combine with the exhaust gas 34 discharged from the biochar pyrolysis reactor 22 along the exhaust line 116. In certain embodiments, the nitrogen-selective membrane 118 and/or the duct burner 120 may be used in an exhaust gas recirculation (EGR) configuration, such as a stoichiometric exhaust gas recirculation (SEGR) configuration, of the power plant 10. In such embodiments, the nitrogen-selective membrane 118 is configured to separate nitrogen oxides ($NO_x$) from the discharged mixture of the syngas and the exhaust gas 34, thereby generating nitrogen 122 and the syngas 86 (e.g., colorific syngas) along a syngas line 124. The nitrogen-selective membrane 118 may be used with or without the duct burner 120. The duct burner 120 may be configured to burn the syngas in the discharged mixture of the syngas and the exhaust gas 34, thereby adding heat to the exhaust gas 34 upstream from the steam generator 14. As a result, the heat added by the duct burner 120 may increase the steam production in the steam generator 14, which may also help to increase power output by the steam turbine system 16. However, in some embodiments, such as embodiments with indirect heat transfer between the exhaust gas 34 and the biomass feedstock 30, the syngas does not mix with the exhaust gas 24, and thus the nitrogen-selective membrane 118 and/or the duct burner 120 may be omitted from the exhaust line 116. Instead, in embodiments with indirect heat transfer between the exhaust gas 34 and the biomass feedstock 30, the biochar pyrolysis reactor 22 is configured to separately discharge the exhaust gas 34 through the exhaust gas outlet 94 and the syngas 86 through the syngas outlet 98. The use of the syngas 86 will be discussed in further detail below.

In embodiments using at least part of the steam 36 in the biochar pyrolysis reactor 22, the steam 36 may be used to heat and drive pyrolysis of the biomass feedstock 30 via direct heat transfer or indirect heat transfer. The biochar pyrolysis reactor 22 may output the steam 36 (or a steam/water mixture) along a steam line 126 back to the steam generator 14. In embodiments using direct heat transfer between the steam 36 and the biomass feedstock 30, one or more post processing systems may be included along the steam line 126 to separate the steam/water from the syngas, such as condensers to condense any steam into water, separators to separate the water from the syngas, or any combination thereof. In embodiments using indirect heat transfer between the steam 36 and the biomass feedstock 30, the biochar pyrolysis reactor 22 is configured to separately discharge the steam 36 through the steam outlet 96 and the syngas 86 through the syngas outlet 98.

In certain embodiments, the biochar pyrolysis reactor 22 is configured only with exhaust gas 34 as the heat source 32, only with steam 36 as the heat source 32, or a combination of both heat sources 32. In embodiments using only the exhaust gas 34 as the heat source 32, the steam supply lines 110 and 112 may be excluded as heat sources 32. Additionally, in certain embodiments, the steam generator 14, the steam turbine system 16, the nitrogen-selective membrane 118, the duct burner 120, or a combination thereof, may be included or excluded depending on whether steam 36 is used as the heat source 32, whether the steam generator 14 is downstream from the biochar pyrolysis reactor 22, and whether the EGR system 18 is present. In embodiments using only the steam 36 as the heat source 32, the exhaust supply line 108 may not be connected to the biochar pyrolysis reactor 22, and the exhaust line 116 having the nitrogen-selective membrane 118 and the duct burner 120 may be omitted from the biochar system 20.

In the illustrated embodiment, the biochar pyrolysis reactor 22 generates the syngas 86 and/or the nitrogen-selective membrane 118 separates the syngas 86 from the exhaust gas 34 along the exhaust line 116, thereby functioning as part of the fuel supply system 66 for the gas turbine system 12. The syngas 86 may at least partially or completely meet the fuel demands of the gas turbine system 12. The fuel supply system 66 includes a heat exchanger 128 (e.g., syngas cooler) configured to cool the syngas 66 via indirect heat exchange with a thermal fluid (e.g., water) circulated through the heat exchanger 128 from a fluid input 130 to a fluid output 132, wherein the thermal fluid discharged from the fluid output 132 may be used for heating elsewhere in the power plant 10, district heating applications, combined heat and power (CHP) applications, or any combination thereof. The fuel supply system 66 also may include a compressor 134 (e.g., syngas compressor) driven by an electric motor or combustion engine, wherein the compressor 134 is configured to compress the syngas 86 to a suitable pressure for storage in a storage tank 136 and/or injection into the combustors 54 of the gas turbine system 12. The storage tank 136 may act as a buffer storage tank as the production of syngas 86 varies over operation of the power plant 10. Thus, when the biochar pyrolysis reactor 22 generates more syngas 86 than demanded or needed for operation of the gas turbine system 12, the excess syngas 86 is stored in the storage tank 136 for later usage when the biochar pyrolysis reactor 22 generates less syngas 86 than demanded or needed for operation of the gas turbine system 12. In this manner, the storage tank 136 combined with the biochar pyrolysis reactor 22 may be configured to meet the fuel demands of the gas turbine system 12 under various operating modes, such as a startup mode, a steady state mode, a shutdown mode, a full load mode, or a part load mode.

In addition to the syngas 86 used by the fuel supply system 66 of the gas turbine system 12, the biochar 28 is used by the biochar sorbent system 24 along the exhaust flow path 82 (e.g., at the exhaust stack 74) to both treat the exhaust gas 34 and enrich the biochar 28. In some embodiments, the biochar sorbent system 24 may operate with biochar from a variety of sources. Thus, the biochar sorbent system 24 may operate completely independent from the biochar pyrolysis reactor 22, or the biochar pyrolysis reactor 22 and the biochar sorbent system 24 may operate together to complement one another and improve operations of the power plant 10. For example, the biochar 28 may be generated entirely by the biochar pyrolysis reactor 22 at the power plant 10, entirely by a biochar pyrolysis reactor (or other source) independent from the power plant 10, or any combination thereof. In the illustrated embodiment, the exhaust gas 34 flows through one or more biochar sorbent systems 24 configured to capture undesirable gases, particularly nitrogen oxides ($NO_x$), such as nitrogen dioxide ($NO_2$) and/or nitrogen oxide (NO). As a result, the biochar sorbent system 24 adsorbs the nitrogen oxides into the biochar 28, which acts as a sorbent material or medium, for capturing the nitrogen oxides to produce the treated gas 84 substantially free of the nitrogen oxides and to produce the nitrogen-rich biochar 38. The nitrogen-rich biochar 38 may then be transported via a transportation system 138 to one or more soil applications 40, such as agricultural applications, farming applications, forestry applications, or any combination thereof. The transportation system 138 may include conveyors, railway systems, trucking systems, or any combination thereof. In some embodiments, the soil applications 40 may correspond to the original source of the biomass feedstock 30. In other words, the biomass feedstock 30 may be acquired from soil applications and returned to the same or similar soil applications. In certain embodiments, the soil applications 40 may include forestry applications, such as afforestation, reforestation, agroforestry, or forest management. In certain embodiments, the soil applications 40 may include peatland and coastal wetland restoration, soil carbon sequestration in croplands and grasslands, biomass burial, biomass sinking, ocean fertilization, or any combination thereof.

In certain embodiments, one or more of the biochar sorbent systems 24 may be used to adsorb one or more undesirable gases, such as the nitrogen oxides ($NO_X$) (e.g., nitrogen dioxide ($NO_2$) and/or nitrogen oxide (NO)), carbon oxides ($CO_X$) (e.g., carbon dioxide ($CO_2$) and carbon monoxide (CO)), sulfur oxides ($SO_X$) (e.g., sulfur dioxide ($SO_2$)), or any combination thereof. The treated gas 84 may be substantially free of the undesirable gases and may be discharged through the exhaust stack 74 to the atmosphere. In certain embodiments, the biochar system 20 may include a plurality of the biochar sorbent systems 24 in a series configuration, a parallel configuration, or a combination thereof.

In the illustrated embodiment, the biochar sorbent system 24 includes a conveyor 140 configured to transport the biochar 28 through the exhaust flow path 82, such as crosswise or lengthwise through the exhaust stack 74. The conveyor 140 may include an electric motor driven internal conveyor, such as a belt conveyor, a screw conveyor or auger conveyor, a gravity driven conveyor with an incline, or any combination thereof. The controller 26 is configured to control the speed (e.g., increase or decrease speed) of the conveyor 140 to control the residence time of the biochar 28 inside of the biochar sorbent system 24, thereby controlling the adsorption of undesirable gases (e.g., $NO_X$) from the exhaust gas 34 into the biochar 28 and thus controlling characteristics of the nitrogen-rich biochar 38 and the treated gas 84. The biochar sorbent system 24 may include a perforated metal housing or duct extending through the exhaust stack 74, such that sufficient openings allow the exhaust gas 34 to flow directly over the biochar 28 moving along the conveyor 140.

In certain embodiments, when the power plant 10 changes between operating modes (e.g., startup mode, steady state mode, shutdown mode, full load mode, or part load mode), the changing operating modes causes changes in the fluid characteristics (e.g., temperature, pressure, flow rate, etc.) of the heated fluids (e.g., exhaust gas 34 and/or steam 36) for the biochar pyrolysis reactor 22, changes in the demand for the syngas 86 generated by the biochar pyrolysis reactor 22, changes in demand for the gas treatment via the biochar sorbent system 24, or any combination thereof. Accordingly, the controller 26 may be configured to control the biochar system 20, including both the biochar pyrolysis reactor 22 and the biochar sorbent system 24, in response to variations in the overall power plant 10, the power grid demand, the syngas demand, biochar demand, and the available heat sources 32 to support the pyrolysis reaction.

In certain embodiments, the controller 26 is configured to control the power plant 10, and particularly the gas turbine system 12, to vary the fuel-air ratio, the combustion flame temperature, or a combination thereof, in a manner increasing undesirable gases (e.g., $NO_X$) counter to normal operational objectives of the power plant 10, while taking advantage of the increases in the undesirable gases (e.g., $NO_X$) in the biochar sorbent system 24 to enrich the biochar 28 and product the nitrogen-rich biochar 38 for various soil applications 40. Thus, by incorporating the biochar sorbent system 24 to adsorb the undesirable gases (e.g., $NO_X$) for a positive goal of enriching the biochar 28, the power plant 10 is able to operate in a wider variety of operating conditions, such as various fuel-air ratios (e.g., fuel-rich, fuel-lean, or stoichiometric), combustion flame temperatures, and so forth. While conventional wisdom would not intentionally operate the power plant 10 to increase the undesirable gases (e.g., $NO_X$), the controller 26 may include operating modes that specifically increase the undesirable gases (e.g., $NO_X$) in combination with operation of the biochar system 20 (e.g., biochar pyrolysis reactor 22 and biochar sorbent system 24).

In certain embodiments, the controller 26 may include a low-$NO_X$ operating mode, an intermediate-$NO_X$ operating mode, and a high-$NO_X$ operating mode, wherein the combustion flame temperature, the $NO_X$ production, and the exhaust gas temperature generally increases from one operating mode to another from the low-$NO_X$ operating mode to the high-$NO_X$ operating mode. The higher temperatures of the exhaust gas 34 may help to increase heat transfer and pyrolysis of the biomass feedstock 30 to generate the biochar 28 in the biochar pyrolysis reactor 22, increase steam production in the steam generator 14, and so forth. Additionally, the high-$NO_X$ production may help to more rapidly enrich the biochar 28 in the biochar sorbent system 24 to generate the nitrogen-rich biochar 38. The different $NO_X$ operating modes may be used in combination with other operating modes, such as a startup mode, a steady state mode, a shutdown mode, a full load mode, or a part load mode, of the gas turbine system 12. For example, the controller 26 may control the gas turbine system 12 to operate in a full load mode in one of the low-$NO_X$, intermediate-$NO_X$, or high-$NO_X$ operating modes, or the controller 26 may control the gas turbine system 12 to operate in a part load mode in in one of the low-$NO_X$, intermediate-$NO_X$, or high-$NO_X$ operating modes. For example, the controller 26 may operate the gas turbine system 12 in the low-$NO_X$ operating mode while in the full load mode, whereas the controller 26 may operate the gas turbine system 12 in the high-$NO_X$ operating mode while in the part load mode. In some embodiments, the controller 26 may operate the gas turbine system 12 to gradually increase the $NO_X$ production and temperature of the exhaust gas 34 with decreases in flow rate of the exhaust gas 34 and/or decreases in load on the gas turbine system 12, whereas the controller 26 may operate the gas turbine system 12 to gradually decrease the $NO_X$ production and temperature of the exhaust gas 34 with increases in flow rate of the exhaust gas 34 and/or increases in load on the gas turbine system 12. With various changes in flow rate, temperature, and $NO_X$ concentration in the exhaust gas 34, the biochar pyrolysis reactor 22 may benefit from increased heat transfer (e.g., higher temperature and/or flow rate) to improve the pyrolysis reaction while the biochar sorbent system 24 may benefit from the increased $NO_X$ concentration to enrich the biochar 28.

As illustrated, the controller 26 includes a processor 142, a memory 144, instructions 146 stored on the memory 144 and executable by the processor 142 to perform various control functions of the controller 26, and communication circuitry 148 to communicate with the various sensors and equipment of the power plant 10. Additional aspects of the control will be discussed in further detail below. Additionally, various embodiments of the power plant 10 having the biochar system 20 will be discussed in further detail below.

Figure 2:
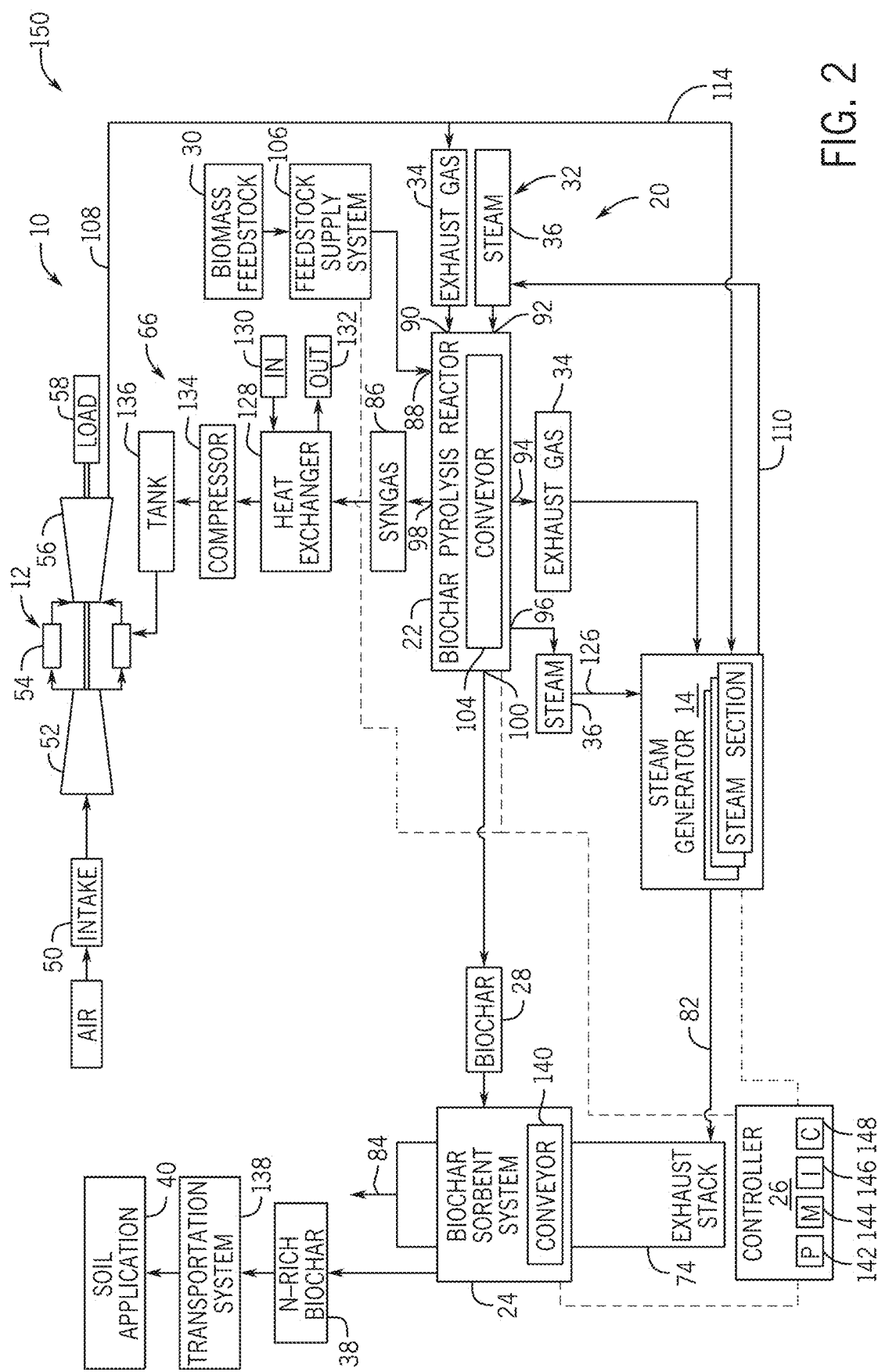
FIG. 2 is a block diagram of an embodiment of a power plant of FIG. 1, illustrating in a simple cycle configuration having the biochar system with both exhaust gas and steam as heat sources for the biochar pyrolysis reactor.

FIG. 2 is a block diagram of an embodiment of the power plant 10 of FIG. 1, illustrating in a simple cycle configuration 150 having the biochar system 20 with both exhaust gas 34 and steam 36 as heat sources 32 for the biochar pyrolysis reactor 22. The power plant 10 of FIG. 2 is substantially the same as discussed in detail above with reference to FIG. 1, except for several variations as discussed below. Accordingly, like element numbers are used for like elements, and thus all aspects of the illustrated power plant 10 and the biochar system 20 are the same as discussed above unless indicated otherwise. In the illustrated embodiment, the simple cycle configuration 150 of the power plant 10 excludes the steam turbine system 16 and the EGR system 18. Additionally, the power plant 10 excludes the nitrogen-selective membrane 118 and the duct burner 120 along the exhaust line 116, although some embodiments may include these components in the power plant 10 of FIG. 2. Additionally, the power plant 10 excludes the air compressor 60, and relies instead on the compressor 52. Otherwise, the embodiment of FIG. 2 is substantially the same as the embodiment of FIG. 1.

In the illustrated embodiment, the biochar pyrolysis reactor 22 uses the exhaust gas 34 and/or the steam 36 for direct and/or indirect heat transfer to the biomass feedstock 30 to generate the biochar 28. For example, the exhaust gas 34 may be directed from one or more exhaust extraction points (e.g., at one or more turbine stages or after the last turbine stage of the turbine 56) to flow through the biochar pyrolysis reactor 22, or the exhaust gas 34 may not be used as one of the heat sources 32. In certain embodiments, the exhaust gas 34 may be directed partially or entirely through the biochar pyrolysis reactor 22 to provide heat transfer (e.g., direct and/or indirect heat transfer) for the pyrolysis reaction, or the exhaust gas 34 may entirely bypass the biochar pyrolysis reactor 22. Similarly, the steam 36 may be directed from one or more steam extraction points to flow through the biochar pyrolysis reactor 22, or the steam 36 may not be used as one of the steam sources 32. As a result of direct and/or indirect heat transfer from the heat sources 32 (e.g., exhaust gas 34 and/or steam 36) to the biomass feedstock 30, the biochar pyrolysis reactor 22 generates the biochar 28. In certain embodiments, all or part of the biochar 28 may be used for the biochar sorbent system 24, directly for the soil application 40, or a combination thereof. In other words, in some embodiments, the biochar 28 without enrichment and/or the biochar 28 with enrichment as the nitrogen-rich biochar 38 may be transported by the transportation system 138 to the soil application 40. The biochar sorbent system 24 adsorbs undesirable gases (e.g., $NO_X$) from the exhaust gas 34 into the biochar 28 to generate the treated gas 84 and the nitrogen-rich biochar 38.

In certain embodiments, the power plant 10 of FIG. 2 may include all or part of the biochar system 20. For example, the power plant 10 may include only the biochar pyrolysis reactor 22, only the biochar sorbent system 24, or a combination of both the biochar pyrolysis reactor 22, and the biochar sorbent system 24. In embodiments without the biochar sorbent system 24, the power plant 10 may include one or more other types of carbon capture system (e.g., sorbent-based carbon capture and/or solvent-based carbon capture) and the biochar 28 generated by the biochar pyrolysis reactor 22 may be used for the soil application 40 without enrichment at the power plant 10. In embodiments without the biochar pyrolysis reactor 22, the power plant 10 may feed biochar to the biochar sorbent system 24 from a variety of external sources, possibly from other power plants having the biochar pyrolysis reactor 22. However, in the illustrated embodiment the biochar system 20 includes the biochar pyrolysis reactor 22 and the biochar sorbent system 24 operating to complement one another and improve the efficiency and value of the power plant 10 by producing the syngas 86 and the nitrogen-rich biochar 38.

Figure 3:
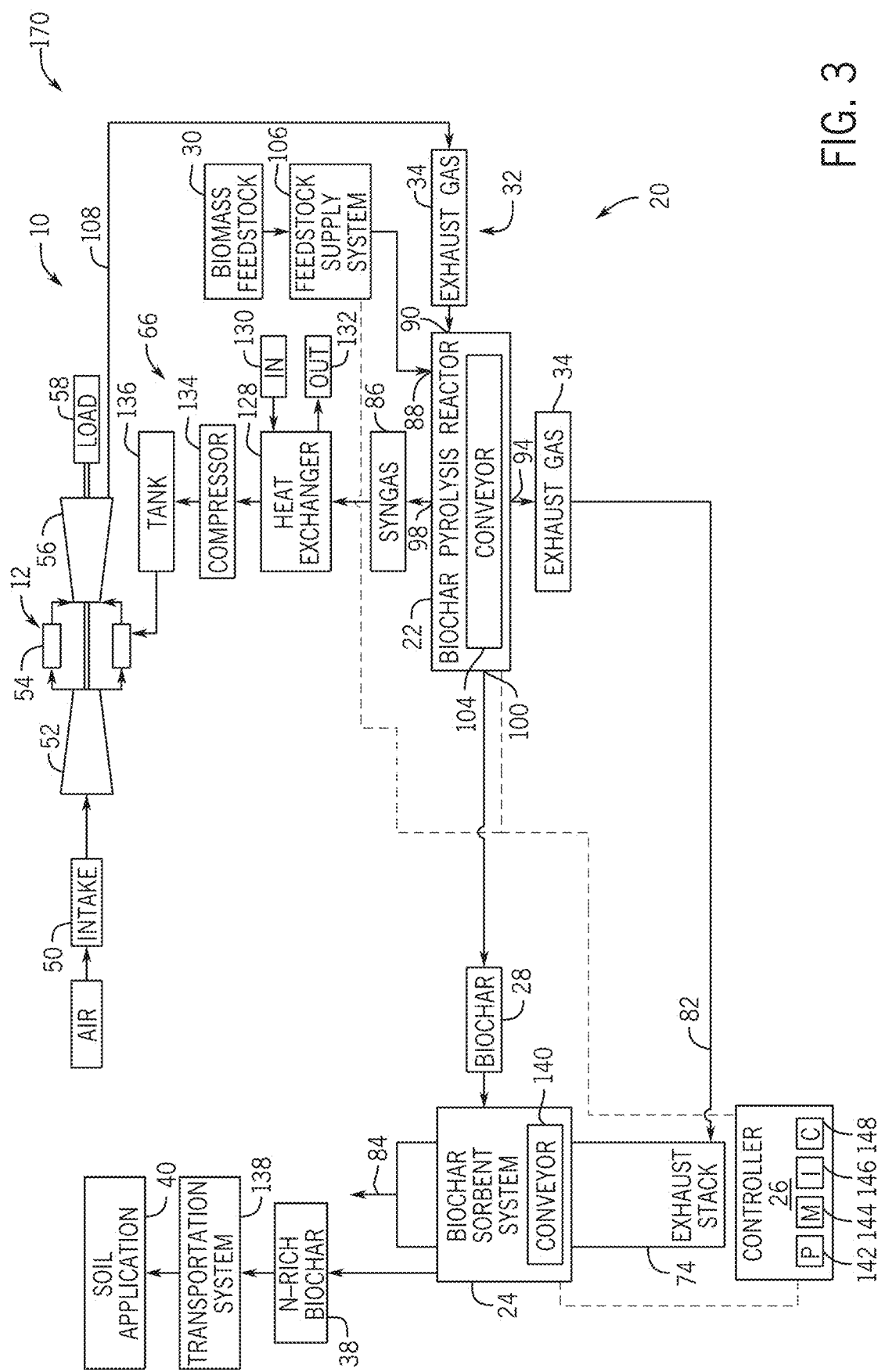
FIG. 3 is a block diagram of an embodiment of a power plant of FIG. 1, illustrating in a simple cycle configuration having the biochar system with exhaust gas as a heat source for the biochar pyrolysis reactor.

FIG. 3 is a block diagram of an embodiment of the power plant 10 of FIG. 1, illustrating in a simple cycle configuration 170 having the biochar system 20 with exhaust gas 34 as the heat source 32 for the biochar pyrolysis reactor 22. The power plant 10 of FIG. 3 is substantially the same as discussed in detail above with reference to FIGS. 1 and 2, except for several variations as discussed below. Accordingly, like element numbers are used for like elements, and thus all aspects of the illustrated power plant 10 and the biochar system 20 are the same as discussed above unless indicated otherwise. In the illustrated embodiment, the simple cycle configuration 170 of the power plant 10 excludes the steam turbine system 16 and the EGR system 18. Additionally, the power plant 10 excludes the nitrogen-selective membrane 118 and the duct burner 120 along the exhaust line 116, although some embodiments may include these components in the power plant 10 of FIG. 3. Additionally, the power plant 10 excludes the air compressor 60, and relies instead on the compressor 52. Otherwise, the embodiment of FIG. 3 is substantially the same as the embodiment of FIG. 1. Furthermore, the embodiment of FIG. 3 is substantially the same as the embodiment of FIG. 2, except that the embodiment of FIG. 3 includes only the exhaust gas 34 as the heat source 32.

In the illustrated embodiment, the biochar pyrolysis reactor 22 operates with heat provided by only the exhaust gas 34 as the heat source 32. Thus, the exhaust gas 34 transfers heat directly and/or indirectly to the biomass feedstock 30 in the biochar pyrolysis reactor 22, thereby generating the syngas 86 for the combustors 54 and the biochar 28 for the biochar sorbent system 24. In the illustrated embodiment, the exhaust gas 34 may flow directly through the internal flow path 102 along the conveyor 104 inside of the biochar pyrolysis reactor 22. The exhaust flow 34 may be in the same flow direction, an opposite flow direction, and/or a crosswise flow direction relative to the biomass feedstock 30 moving along the conveyor 104. However, the direct contact and direct heat transfer between the exhaust gas 34 and the biomass feedstock 30 may enable a relatively simple design of the biochar pyrolysis reactor 22. In some embodiments, the exhaust gas 34 may flow through separate conduits, flow paths, and/or heat exchangers for indirect heat transfer with the biomass feedstock 30 in the biochar pyrolysis reactor 22. All other aspects of the power plant 10 are the same as discussed above with reference to FIGS. 1 and 2.

Figure 4:
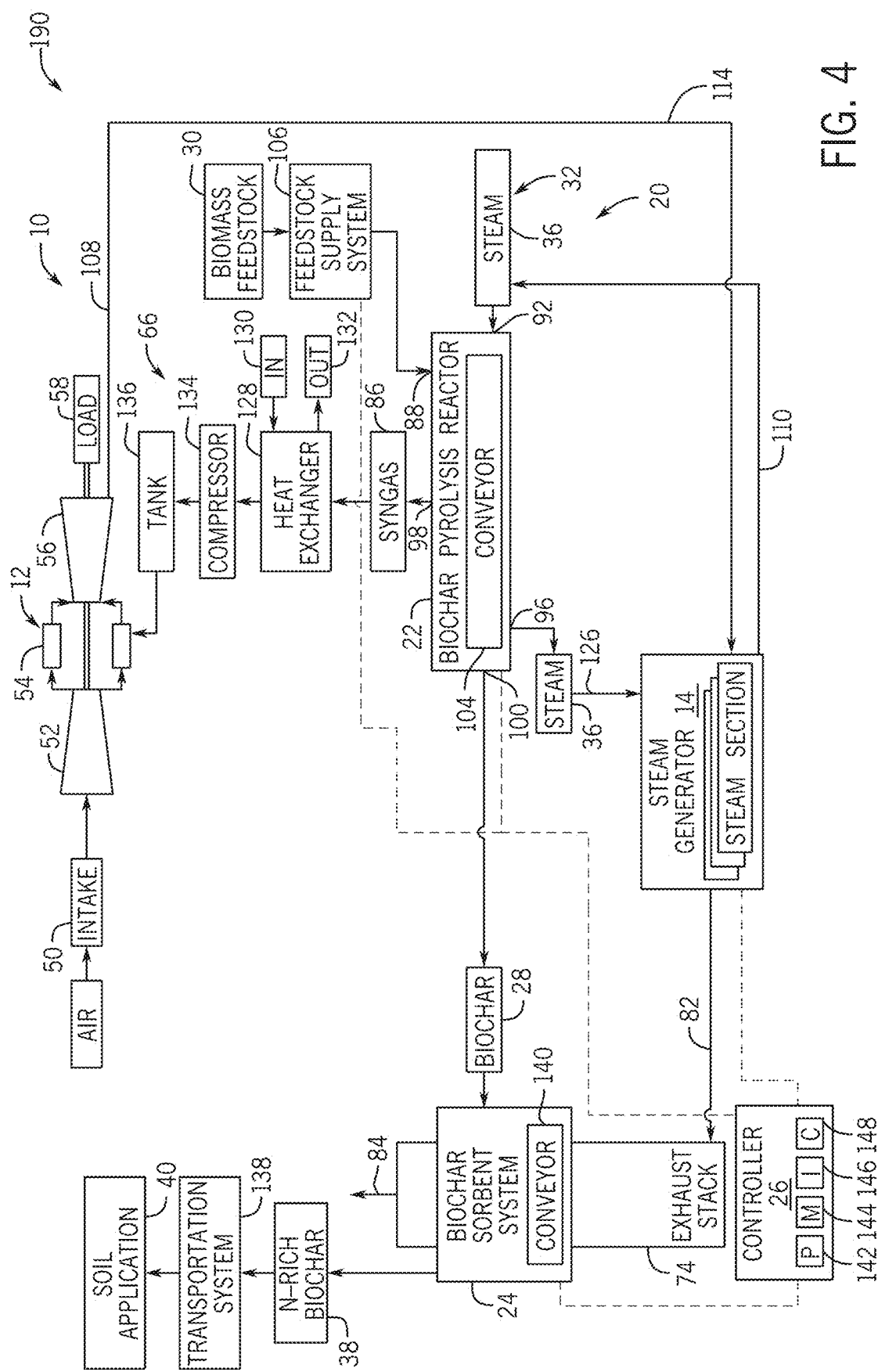
FIG. 4 is a block diagram of an embodiment of a power plant of FIG. 1, illustrating in a simple cycle configuration having the biochar system with steam as a heat source for the biochar pyrolysis reactor.

FIG. 4 is a block diagram of an embodiment of the power plant 10 of FIG. 1, illustrating in a simple cycle configuration 190 having the biochar system 20 with steam 36 as the heat source 32 for the biochar pyrolysis reactor 22. The power plant 10 of FIG. 4 is substantially the same as discussed in detail above with reference to FIGS. 1 and 2, except for several variations as discussed below. Accordingly, like element numbers are used for like elements, and thus all aspects of the illustrated power plant 10 and the biochar system 20 are the same as discussed above unless indicated otherwise. In the illustrated embodiment, the simple cycle configuration 190 of the power plant 10 excludes the steam turbine system 16 and the EGR system 18. Additionally, the power plant 10 excludes the nitrogen-selective membrane 118 and the duct burner 120 along the exhaust line 116, although some embodiments may include these components in the power plant 10 of FIG. 4. Additionally, the power plant 10 excludes the air compressor 60, and relies instead on the compressor 52. Otherwise, the embodiment of FIG. 4 is substantially the same as the embodiment of FIG. 1. Furthermore, the embodiment of FIG. 4 is substantially the same as the embodiment of FIG. 2, except that the embodiment of FIG. 4 includes only the steam 36 as the heat source 32.

In the illustrated embodiment, the biochar pyrolysis reactor 22 operates with heat provided by only the steam 36 as the heat source 32. Thus, the exhaust gas 34 transfers heat to water in the steam generator 16 to generate the steam 36, which in turn is used by the biochar pyrolysis reactor 22. In this manner, the heat source 32 still originates from the combustion process in the gas turbine system 12, which generates the exhaust gas 34. However, the steam 36 is used to transfer heat directly and/or indirectly to the biomass feedstock 30 in the biochar pyrolysis reactor 22, thereby generating the syngas 86 for the combustors 54 and the biochar 28 for the biochar sorbent system 24. All other aspects of the power plant 10 are the same as discussed above with reference to FIGS. 1 and 2.

Figure 5:
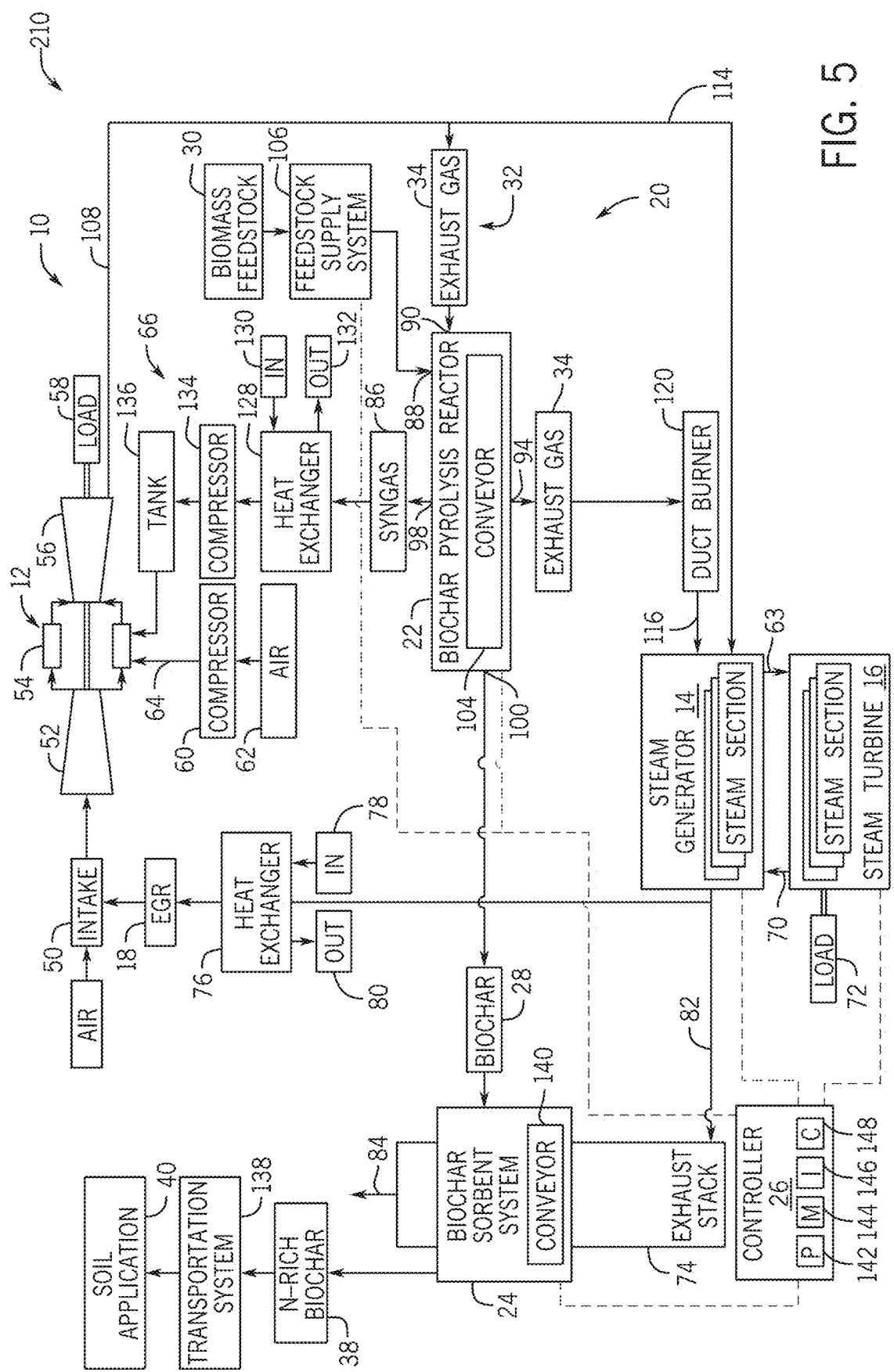
FIG. 5 is a block diagram of an embodiment of a power plant of FIG. 1, illustrating in a stoichiometric exhaust gas recirculation (SEGR) configuration having the biochar system, wherein exhaust gas is a heat source for the biochar pyrolysis reactor and a duct burner is downstream from the biochar pyrolysis reactor.

FIG. 5 is a block diagram of an embodiment of the power plant 10 of FIG. 1, illustrating in a stoichiometric exhaust gas recirculation (SEGR) configuration 210 having the biochar system 20, wherein exhaust gas 34 is the heat source 32 for the biochar pyrolysis reactor 22 and the duct burner 120 is downstream from the biochar pyrolysis reactor 22. The power plant 10 of FIG. 5 is substantially the same as discussed in detail above with reference to FIG. 1, except for several variations as discussed below. Accordingly, like element numbers are used for like elements, and thus all aspects of the illustrated power plant 10 and the biochar system 20 are the same as discussed above unless indicated otherwise. In the illustrated embodiment, the SEGR configuration 210 of the power plant 10 excludes the nitrogen-selective membrane 118 along the exhaust line 116. Additionally, the power plant 10 excludes the steam 36 as one of the heat sources 32 and relies instead on the exhaust gas 34 for the heat source 32. Otherwise, the embodiment of FIG. 5 is substantially the same as the embodiment of FIG. 1.

In the illustrated SEGR configuration 210, the power plant 10 is configured to operate with the EGR system 18 using a stoichiometric combustion in the combustors 54 of the gas turbine system 12. Thus, the compressor 52 is configured to compress the exhaust gas 34 recirculated to the intake 50 for delivery of a compressed exhaust gas to the combustors 54, while the air compressor 60 is configured to separately deliver a compressed air 64 to the combustors 54. The fuel supply system 66 also delivers the syngas 86 as fuel to the combustors 54. The controller 26 is configured to control the combustion of the syngas 86 with the air and the recirculated exhaust gas, thereby providing a substantially stoichiometric ratio of the fuel (e.g., syngas 86) and the air resulting in substantially stoichiometric combustion. One measure of stoichiometric combustion is the equivalence ratio, or phi ($\phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. The stoichiometric combustion of fuel and oxidant in the combustors 54 may result in products of combustion or exhaust gas 34 with substantially no unburnt fuel or oxidant remaining. Thus, the exhaust gas 34 (e.g., substantially free of unburnt fuel or oxidant) may be particularly well-suited for the biochar system 20 of FIG. 5.

For example, the exhaust gas 34 (e.g., substantially free of unburnt fuel or oxidant) may be particularly well-suited for direct heat transfer with the biomass feedstock 30 moving through the biochar pyrolysis reactor 22 via the conveyor 104. The exhaust gas 34 is able to transfer heat directly to the biomass feedstock 30 without any substantial contamination caused by unburnt fuel or oxidant, thereby driving the pyrolysis reaction of the biomass feedstock 30 via direct heat transfer. As a result, the syngas is formed or mixed directly with the exhaust gas 34 flowing through the biochar pyrolysis reactor 22, such that the discharged mixture of syngas 86 and exhaust gas 34 flows out of the biochar pyrolysis reactor 22 along the exhaust line 116. As discussed above with reference to FIG. 1, the duct burner 120 is configured to burn the syngas mixed with the exhaust gas 34, thereby further heating the exhaust gas 34 upstream of the steam generator 14. The heat added by the duct burner 120 helps increase steam production in the steam generator 14 for use in the steam turbine system 16 and/or elsewhere in the power plant 14. As a result, the duct burner 120 helps to improve the efficiency of the power plant 10. After the steam generator 14, the exhaust gas 34 flows through the exhaust stack 74 for treatment by the biochar sorbent system 24 as discussed in detail above.

Additionally, the biochar pyrolysis reactor 22 may output the syngas 86 (or a mixture of syngas 86 and exhaust gas 34) for use as fuel in the fuel supply system 66 coupled to the gas turbine system 12. In some embodiments, given that the power plant 10 is operating with the EGR system 18, the mixture of syngas 86 and exhaust gas 34 is cooled by the heat exchanger 128, compressed by the compressor 134, stored by the storage tank 136, and used as fuel in the combustors 54 without separating the exhaust gas 34 from the syngas 86. In some embodiments, the fuel supply system 66 may be configured to separate the syngas 86 from the exhaust gas 34, at least for purposes of storage in the storage tank 136. In some embodiments the fuel supply system 66 may be used when operating the biochar pyrolysis reactor 22 in an indirect heat transfer mode, wherein the exhaust gas 34 indirectly transfers heat to the biomass 30 moving along the conveyor 104 in the biochar pyrolysis reactor 22.

As appreciated, the $NO_X$ concentration in the exhaust gas 34 may depend on the combustion flame temperature, the fuel-air ratio or equivalence ratio, and the amount of diluent (e.g., recirculated exhaust gas via the EGR system 18). Thus, the controller 26 may control one or more operating parameters of the gas turbine system 12 (e.g., the combustion flame temperature, the fuel-air ratio or equivalence ratio, the amount of diluent (EGR flow), or any combination thereof) to control the $NO_X$ concentration in various $NO_X$ modes as discussed in detail above. In certain embodiments, the controller 26 may control one or more operating parameters of the gas turbine system 12 to increase the $NO_X$ concentration, while controlling the biochar sorbent system 24 to adsorb the $NO_X$ and enrich the biochar 28 to generate the nitrogen-rich biochar 38. Thus, the increased $NO_X$ concentration becomes a valuable advantage in the biochar system 20, which generates a useful product (e.g., nitrogen-rich biochar 38) for use in various soil applications 40. When operating in a part load mode, the gas turbine system 12 may not be generating any power for a power grid, yet the gas turbine system 12 still produces the useful product (e.g., nitrogen-rich biochar 38). In certain embodiments, while operating in the part load mode, the power plant 10 may be operated in a manner maximizing production of the biochar 28, the syngas 86, and/or the nitrogen-rich biochar 38.

Figure 6:
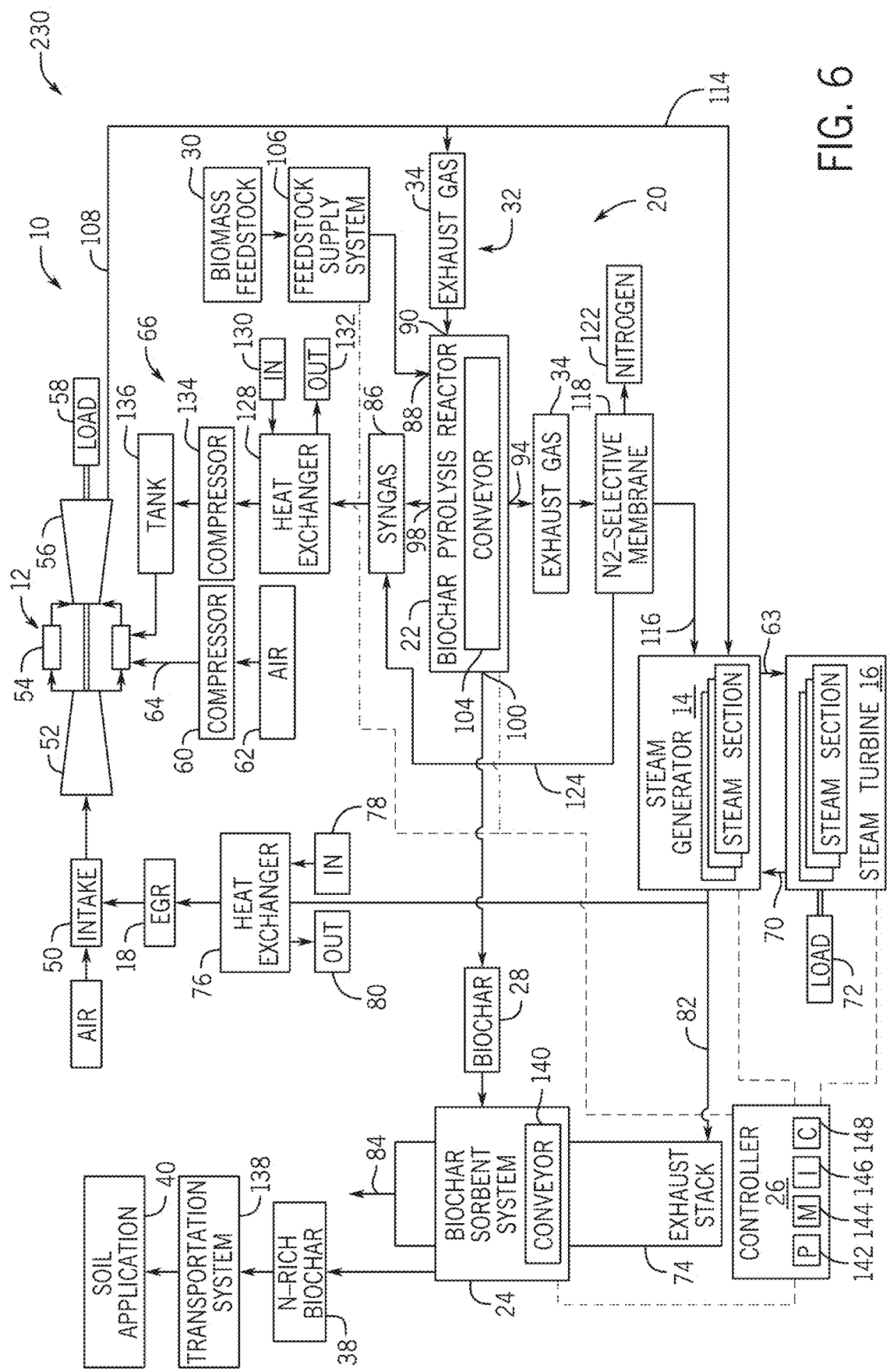
FIG. 6 is a block diagram of an embodiment of a power plant of FIG. 1, illustrating in a stoichiometric exhaust gas recirculation (SEGR) configuration having the biochar system, wherein exhaust gas is a heat source for the biochar pyrolysis reactor and a nitrogen-selective membrane is downstream from the biochar pyrolysis reactor.

FIG. 6 is a block diagram of an embodiment of the power plant 10 of FIG. 1, illustrating in a stoichiometric exhaust gas recirculation (SEGR) configuration 230 having the biochar system 20, wherein exhaust gas 34 is the heat source 32 for the biochar pyrolysis reactor 22 and the nitrogen-selective membrane 118 is downstream from the biochar pyrolysis reactor 22. The power plant 10 of FIG. 6 is substantially the same as discussed in detail above with reference to FIGS. 1 and 5, except for several variations as discussed below. Accordingly, like element numbers are used for like elements, and thus all aspects of the illustrated power plant 10 and the biochar system 20 are the same as discussed above unless indicated otherwise. In the illustrated embodiment, the SEGR configuration 230 of the power plant 10 excludes the duct burner 120 and includes the nitrogen-selective membrane 118 along the exhaust line 116. Additionally, the power plant 10 excludes the steam 36 as one of the heat sources 32 and relies instead on the exhaust gas 34 for the heat source 32. Otherwise, the embodiment of FIG. 6 is substantially the same as the embodiment of FIG. 1. Furthermore, the embodiment of FIG. 6 is substantially the same as the embodiment of FIG. 5, except that the embodiment of FIG. 6 includes the nitrogen-selective membrane 118 rather than the duct burner 120. Although the embodiment of FIG. 6 includes the steam generator 14 and the steam turbine system 16, certain embodiments of the SEGR configuration 230 of FIG. 6 may exclude the steam generator 14 and/or the steam turbine system 16.

As discussed above, the SEGR configuration 230 operates with substantially stoichiometric combustion, which results in the exhaust gas 34 being substantially free of unburnt fuel or oxidant. Thus, the exhaust gas 34 may be well-suited for direct heat transfer with the biomass feedstock 30 in the biochar pyrolysis reactor 22 without any substantial contamination caused by unburnt fuel or oxidant, thereby driving the pyrolysis reaction of the biomass feedstock 30 via direct heat transfer. As a result, the syngas is formed or mixed directly with the exhaust gas 34 flowing through the biochar pyrolysis reactor 22, such that the discharged mixture of syngas and exhaust gas 34 flows out of the biochar pyrolysis reactor 22 along the exhaust line 116. As discussed above with reference to FIG. 1, the nitrogen-selective membrane 118 is configured to separate nitrogen oxides ($NO_X$) from the discharged mixture of the syngas and the exhaust gas 34, thereby generating nitrogen 122 and the syngas 86 (e.g., colorific syngas) along the syngas line 124. Thus, the fuel supply system 66 can use the syngas 86 generated by the nitrogen-selective membrane 118 for use in the combustors 54 of the gas turbine system 12.

In certain embodiments, the exhaust gas 34 discharged from the nitrogen-selective membrane 118 may be directed through the steam generator 14 (if included) followed by the exhaust stack 74, or the exhaust gas 34 discharged from the nitrogen-selective membrane 118 may be directed to the exhaust stack 74 without any steam generation. Again, certain embodiments of the SEGR configuration 230 may exclude the steam generator 14 and/or the steam turbine system 16. The biochar sorbent system 24 operates substantially the same as discussed in detail above.

Figure 7:
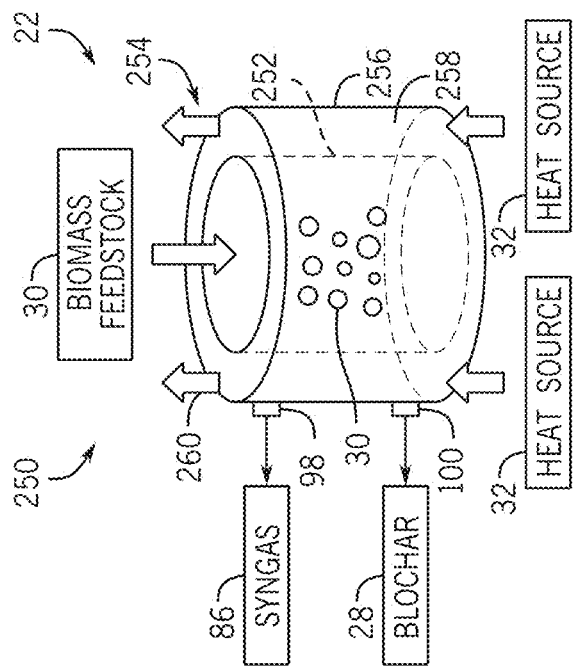
FIG. 7 is a schematic of an embodiment of the biochar pyrolysis reactor of the biochar system of FIGS. 1-6, further illustrating an indirect heat transfer configuration.

FIG. 7 is a schematic of an embodiment of the biochar pyrolysis reactor 22 of the biochar system 20 of FIGS. 1-6, further illustrating an indirect heat transfer configuration 250, wherein the heat transfer fluid or heat source 32 (e.g., exhaust gas 34 and/or steam 36) drives pyrolysis of the biomass feedstock 30 via indirect heat transfer. In the illustrated embodiment, the indirect heat transfer configuration 250 isolates the biomass feedstock 30 within an inner tube 252 of a double-pipe heat exchanger 254 from the heat source 32 within an outer shell 256 of the double-pipe heat exchanger 254. Thus, the products (e.g., biochar 28 and syngas 86) of the pyrolysis of biomass feedstock 30 are contained within the inner tube 252 and do not mix with the heat source 32 within the outer shell 256 (e.g., annular chamber 258 between inner tube 252 and outer shell 256). In such embodiments, the heat source 32, the syngas 86, and the biochar 28 may be separately discharged from the biochar pyrolysis reactor 22 through a heat transfer fluid outlet 260 (e.g., exhaust gas outlet 94 and/or steam outlet 96), the syngas outlet 98, and the biochar outlet 100, respectively. In the illustrated embodiment, the heat source 32 indirectly transfers heat to the biomass feedstock through a wall (e.g., annular wall) of the inner tube 252 to the biomass feedstock 30. However, any suitable configuration of the biochar pyrolysis reactor 22 in an indirect heat transfer configuration 250 is within the scope of the disclosed embodiments.

Figure 8:
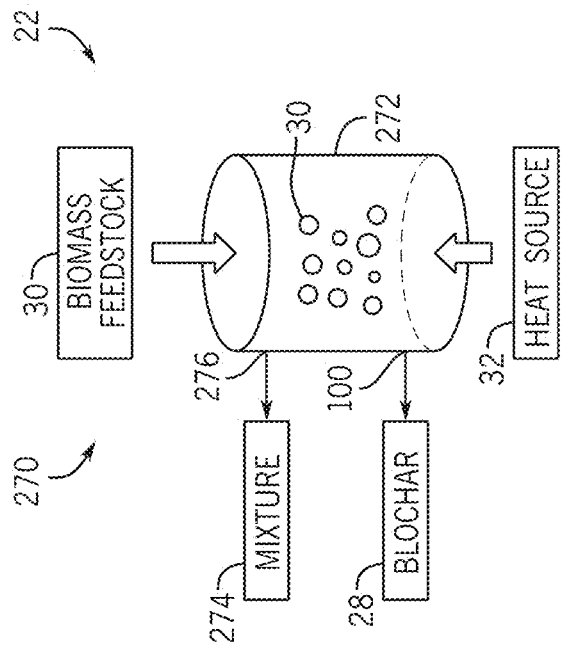
FIG. 8 is a schematic of an embodiment of the biochar pyrolysis reactor of the biochar system of FIGS. 1-6, further illustrating a direct heat transfer configuration.

FIG. 8 is a schematic of an embodiment of the biochar pyrolysis reactor 22 of the biochar system 20 of FIGS. 1-6, further illustrating a direct heat transfer configuration 270, wherein the heat transfer fluid or heat source 32 (e.g., exhaust gas 34 and/or steam 36) drives pyrolysis of the biomass feedstock 30 via direct heat transfer. In the illustrated embodiment, the direct heat transfer configuration 270 enables the heat transfer fluid 32 to directly flow across and transfer heat to the biomass feedstock 30 within a tube 272. The products (e.g., biochar 28 and syngas 86) of the pyrolysis of biomass feedstock 30 is mixed directly with the heat source 32 flowing through the biochar pyrolysis reactor 22, creating a mixture 274 of syngas 86 and the heat source 32 that is output through a mixture outlet 276. The mixture 274 may be subsequently separated and/or used together as discussed above. For example, a separator, a heat exchanger (e.g., condenser or cooler), or any combination thereof, may be used to separate the steam 36 from the syngas 86. By further example, a burner (e.g., duct burner 120) may be used to combust the syngas 86 in the mixture 274, thereby increasing the temperature of the heat source 32 (e.g., exhaust gas 34 and/or steam 36) in the mixture 274. By further example, a nitrogen-selective membrane 118 may be used to separate the syngas 86 and nitrogen 122 from the heat source 32 (e.g., exhaust gas 34 and/or steam 36) in the mixture 274. However, any suitable configuration of the biochar pyrolysis reactor 22 in a direct heat transfer configuration 270 is within the scope of the disclosed embodiments.

Figure 9:
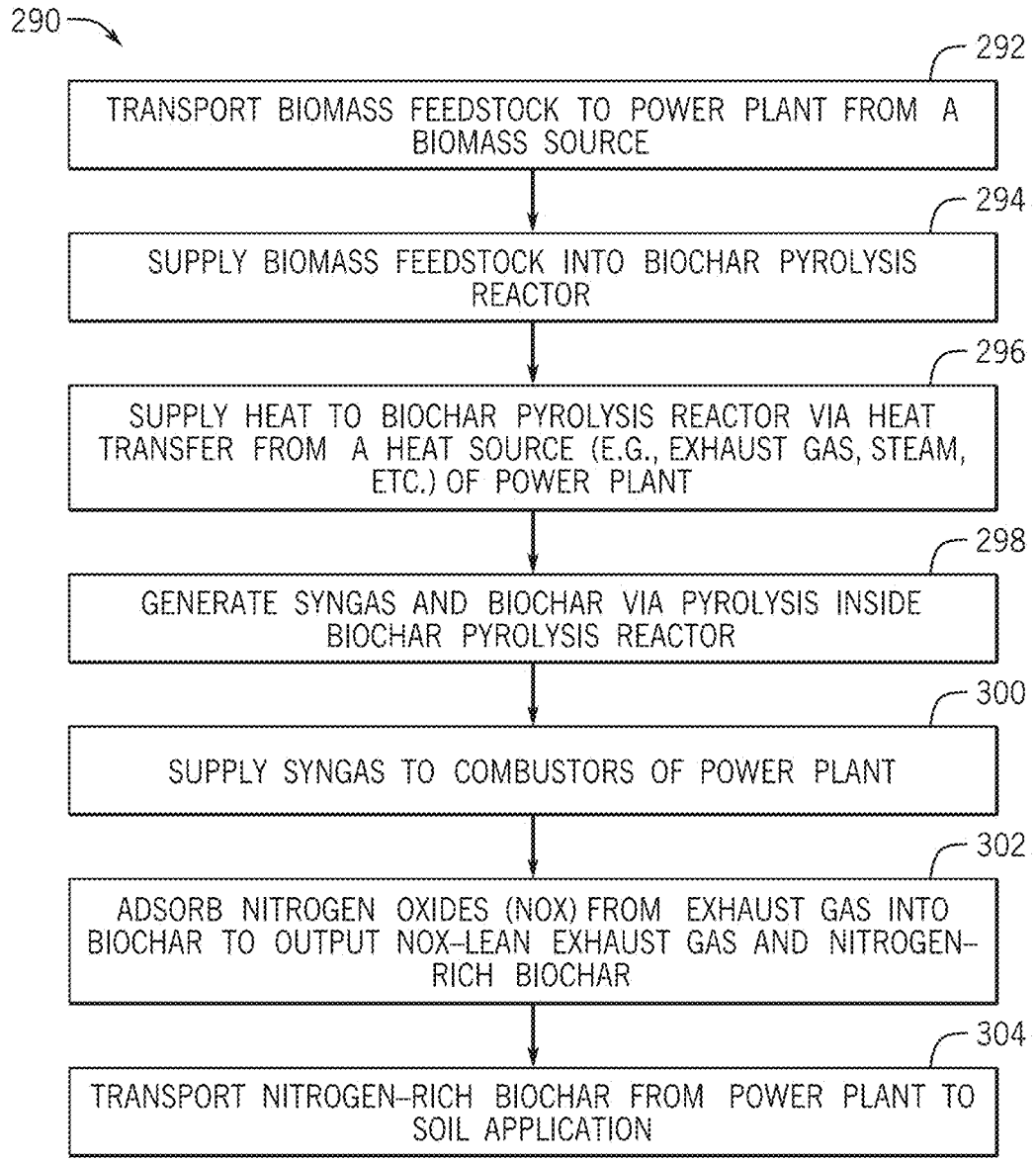
FIG. 9 is a flow chart of an embodiment of a process for operating the biochar system in the power plant of FIGS. 1-6.

FIG. 9 is a flow chart of an embodiment of a process 290 for operating the biochar system 20 in the power plant 10 of FIGS. 1-6. In the illustrated embodiment, the process 290 includes transporting a biomass feedstock (e.g., 30) to a power plant (e.g., 10) form a biomass source (block 292). The biomass source may include agricultural sites, farms, forests, industrial facilities, waste processing facilities, or any combination thereof. The biomass feedstock may include industrial waste and co-products, food waste, agricultural residues (e.g., straw), plants (e.g., maize, switchgrass, miscanthus and bamboo), energy crops, wood, wood residues, or any combination thereof, in a variety of forms (e.g., pellets). The power plant may include a coal plant, a gas turbine power plant, or any thermally driven power plant that uses a fuel to generate an exhaust gas with undesirable gases (e.g., $NO_X$). The process 290 may then supply the biomass feedstock into a biochar pyrolysis reactor (e.g., 22) (block 294). For example, the supply of biomass feedstock may include use of a conveyor to move the biomass feedstock vertically, horizontally, and/or at an incline into the biomass inlet of the biochar pyrolysis reactor. The process 290 may then supply heat to the biochar pyrolysis reactor via heat transfer from a heat source (e.g., exhaust gas 34 and/or steam 36) of the power plant (block 296). The heat may be transferred directly and/or indirectly via one or more internal flow paths (e.g., 102) through the biochar pyrolysis reactor. The heat may originate from combustion of fuel in the power plant, and thus the heat is integrally generated with operation of the power plant. The process 290 may then generate syngas (e.g., 86) and biochar (e.g., 28) via pyrolysis of the biomass feedstock inside the biochar pyrolysis reactor (block 298). The process 290 may then supply the generated syngas to combustors (e.g., 54) of the power plant (block 300). The process 290 may then adsorb nitrogen oxides ($NO_X$) from exhaust gas into the biochar to output a NOX-lean exhaust gas (e.g., treated gas 84) and nitrogen-rich biochar (e.g., 38) (block 302). Finally, the process 290 may transport the nitrogen-rich biochar from the power plant to one or more soil applications (e.g., 40) (block 304). For example, the soil applications may include various sustainable soil sinks, such as agriculture, forestry, farming, and so forth. The foregoing process 290 may be controlled by the controller 26 or any other suitable processor-based controller or system. Furthermore, the foregoing process 290 may include any and all aspects of control and operation of the power plant 10 as discussed in detail above with reference to FIGS. 1-8.

Figure 10:
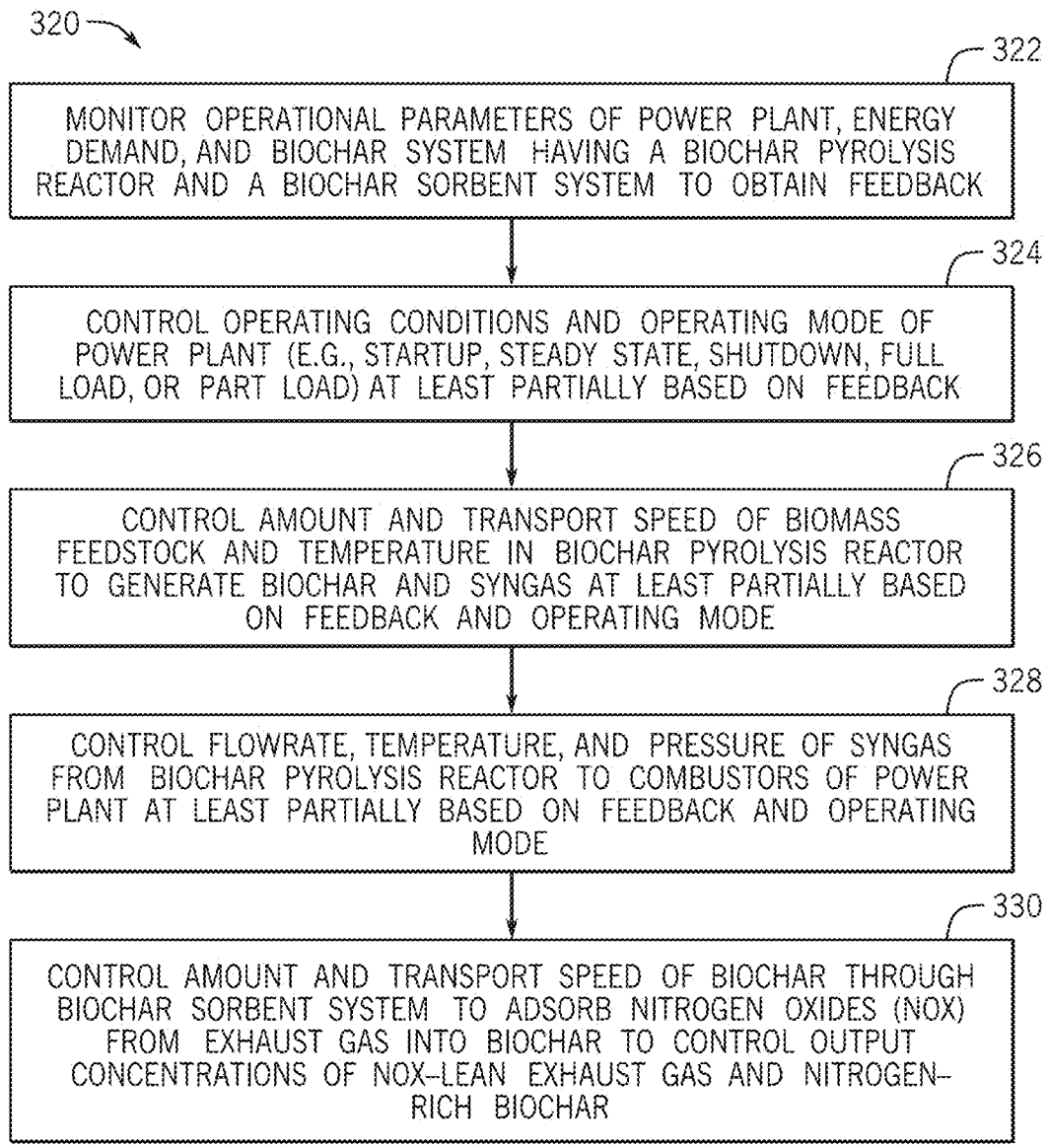
FIG. 10 is a flow chart of an embodiment of a process for controlling operation of power plant and the biochar system of FIGS. 1-6.

FIG. 10 is a flow chart of an embodiment of a process 320 for controlling operation of power plant 10 and the biochar system 20 of FIGS. 1-6. In the illustrated embodiment, the process 320 includes monitoring operational parameters of a power plant (e.g., 10), an energy demand, and a biochar system (e.g., 20) having a biochar pyrolysis reactor (e.g., 22) and a biochar sorbent system (e.g., 24) to obtain feedback (block). The operational parameters of the power plant may include combustion parameters (e.g., fuel-air ratio, equivalence ratio, combustion flame temperature), EGR parameters (e.g., EGR flow rate, temperature, gas composition, etc.), emissions levels of undesirable gases in the exhaust gas (e.g., $NO_X$, CO, $CO_2$, etc.), exhaust gas temperature and flow rate, steam parameters (e.g., steam production temperature, pressure, flow rate, etc.), or any combination thereof. The energy demand may correspond to electricity demand on a power grid, which may vary between peak demand during hottest portions of the day and minimum demand at night. Thus, the energy demand may have an impact on the operation and power production by the power plant. The operational parameters of the biochar system may include flow rates, temperatures, pressures, and/or heat transfer properties of thermal fluids (e.g., exhaust gas and/or steam) used in the biochar pyrolysis reactor, feed/transport rates of biomass feedstock through the biochar pyrolysis reactor, production rates for syngas production, gas composition of the syngas, production rates for biochar production, biochar properties (e.g., quality or other indicia of the pyrolysis reaction as indicated by the biochar product, quality and availability of the biomass feedstock, upper and lower thresholds for the pyrolysis reaction (e.g., temperatures, residence time of biomass in presence of heat, etc.), or any combination thereof. A variety of feedback may be used for control of the power plant and the biochar system according to the process 320 of FIG. 10, including all aspects as described in detail above with reference to FIGS. 1-9.

The process 320 may then proceed to control operating conditions and an operating mode of the power plant (e.g., startup mode, steady state mode, shutdown mode, full load mode, or part load mode) at least partially based on the feedback (block 324). For example, the energy demand variations may be at least operating parameter that the process 320 may use to increase or decrease the load of the power plant. In certain embodiments, the process 320 may control the power plant to change from a full load mode during a peak energy demand to a part load mode during a lower or minimum energy demand by the power grid. Similarly, the process 320 may adjust the operating mode (e.g., part load mode, full load mode, etc.) depending on the needs and value generated by operating the biochar system.

The process 320 may further control an amount and a transport speed of biomass feedstock (e.g., 30) and a temperature in a biochar pyrolysis reactor to generate biochar (e.g., 28) and syngas (e.g., 86) at least partially based on the feedback and operating mode of the power plant (block 326). For example, the transport speed of the biomass feedstock through the biochar pyrolysis reactor may be increased to reduce residence time and decreased to increase residence time in the biochar pyrolysis reactor. The amount of the biomass feedstock (combined with the transport speed) through the biochar pyrolysis reactor may be used to vary the overall production rate of the biochar by the biochar pyrolysis reactor. The temperature of the biochar pyrolysis reactor may be increased to increase the pyrolysis rate or decreased to decrease the pyrolysis rate of the biomass feedstock in the biochar pyrolysis reactor. The amount, transport speed, and temperature may be increased or decreased depending on the operating mode (e.g., full load versus part load), temperature and flow rate of exhaust gas, concentration of undesirable gases ($NO_X$) in the exhaust gas, demand for syngas by the power plant, or any combination thereof. For example, the process 320 may control (e.g., vary, increase, or decrease) the production of biochar and syngas at least partially based on available heat sources (e.g., exhaust gas 34 and/or steam 36) used to control the temperature in the biochar pyrolysis reactor. In certain embodiments, the process 320 may increase the amount and/or transport speed of the biomass feedstock when the heat sources are available at higher temperatures, higher flow rates, and/or higher pressures, such as when exhaust flow rates are higher during full load conditions. Similarly, the process 320 may reduce the amount and/or transport speed of the biomass feedstock when the heat sources are available at lower temperatures, lower flow rates, and/or lower pressures, such as when exhaust flow rates are lower during part load conditions. In general, the process 320 may respond to various operating conditions and control the biochar pyrolysis system in a manner producing a desired output of syngas and biochar.

The process 320 may control a flowrate, a temperature, and a pressure of syngas from the biochar pyrolysis reactor to combustors (e.g., 54) of the power plant at least partially based on the feedback and operating mode (block 328). For example, the process 320 may control cooling of the syngas in a heat exchanger (e.g., 128), compression of the syngas in a compressor (e.g., 134), storage of excess syngas in a tank (e.g., 136), and/or flow to the combustors via one or more valves. Additionally, the process 320 may control syngas production by the biochar pyrolysis reactor by controlling the pyrolysis reaction. For example, the process 320 may increase syngas production by increasing the pyrolysis reaction, such as by increasing the quantity and/or transport speed of the biomass feedstock and/or increasing the temperature and/or flow rate of thermal fluids (e.g., exhaust gas 34 and/or steam 36). By further example, the process 320 may decrease syngas production by decreasing the pyrolysis reaction, such as by decreasing the quantity and/or transport speed of the biomass feedstock and/or decreasing the temperature and/or flow rate of thermal fluids (e.g., exhaust gas 34 and/or steam 36). For example, the process 320 may reduce syngas production during a part load mode and increase syngas production during a full load mode.

The process 320 may control an amount and a transport speed of biochar through a biochar sorbent system (e.g., 24) to adsorb nitrogen oxides ($NO_X$) from the exhaust gas into biochar to control output concentrations of $NO_X$-lean exhaust gas (e.g., treated gas 84) and nitrogen-rich biochar (e.g., 38) (block 330). For example, the process 320 may increase the amount and/or reduce the transport speed of the biochar in the biochar sorbent system to adsorb more of the $NO_X$ from the exhaust gas and/or increase the nitrogen concentration in the nitrogen-rich biochar. By further example, the process 320 may reduce the amount and/or increase the transport speed of the biochar in the biochar sorbent system to adsorb less of the $NO_X$ from the exhaust gas and/or reduce the nitrogen concentration in the nitrogen-rich biochar. By further example, the process 320 may change the amount and/or the transport speed of the biochar in the biochar sorbent system depending on the flow rate, temperature, and/or undesirable gas concentration (e.g., $NO_X$ concentration) of the exhaust gas being treated by the biochar sorbent system. As appreciated, higher flow rates may occur during full load whereas lower flow rates may occur during part load of the power plant. As the flow rates and loads change, the amount and/or transport speed of the biochar in the biochar sorbent system may be adjusted by the process 320 to ensure sufficiently high threshold concentrations of nitrogen in the nitrogen-rich biochar and sufficiently low threshold concentrations of undesirable gases ($NO_X$) in the $NO_X$-lean exhaust gas. For example, the process 320 may increase the amount and/or reduce the transport speed of the biochar in the biochar sorbent system for higher flowrates of the exhaust gas, higher concentrations of $NO_X$ in the exhaust gas, and higher loads of the power plant. By further example, the process 320 may decrease the amount and/or increase the transport speed of the biochar in the biochar sorbent system for lower flowrates of the exhaust gas, lower concentrations of $NO_X$ in the exhaust gas, and lower loads of the power plant.

Technical effects of the disclosed embodiments include integration of a biochar system having a biochar pyrolysis reactor and/or a biochar sorbent system with an industrial plant, such as a power plant having a gas turbine system. The biochar pyrolysis reactor integrates with available heat sources in the power plant to drive a pyrolysis reaction, thereby generating both biochar and syngas. The syngas can be further used as fuel for combustors in the power plant, such as for combustors of the gas turbine system. The biochar may be a valuable resource in soil applications with or without the biochar sorbent system. However, the biochar sorbent system adds more value to the power plant by using the biochar as a sorbent material to adsorb undesirable gases from the exhaust gas while simultaneously enriching the biochar for greater value in the soil applications. For example, the biochar may adsorb nitrogen oxides ($NO_X$) from the exhaust gas, thereby enriching the biochar with nitrogen to generate nitrogen-rich biochar for the soil applications. The biochar system may continue to operate in various operating conditions of the power plant, including a part load mode, a full load node, a startup mode, a steady state mode, an EGR mode, a SEGR mode, a variable $NO_X$ mode, or any combination thereof. For example, if the power plant is changed from a full load mode to a part load mode, for example, due to a lower energy demand on a power grid, then the biochar system can continue to add value to the power plant in the part load mode by generating the syngas and the biochar. By further example, the power plant may be controlled with greater flexibility in a fuel-rich mode, a fuel-lean mode, and/or a stoichiometric mode by virtue of the biochar system, which benefits from increased $NO_X$ production. In certain embodiments, the power plant may intentionally control the $NO_X$ production to increase, which would normally be against conventional wisdom and emissions requirements, while using the biochar sorbent system to adsorb the $NO_X$ and enrich the biochar to generate the nitrogen-rich biochar for the soil applications.

The subject matter described in detail above may be defined by one or more clauses, as set forth below.

A system includes a gas turbine system having a compressor, a combustor, and a turbine, wherein the combustor is configured to combust fuel and oxidant in a substantially stoichiometric equivalence ratio, phi ($\phi$), of between 0.95 to 1.05. The system further includes an exhaust gas recirculation (EGR) system configured to recirculate an exhaust gas from the turbine to an intake into the compressor. The system further includes a biochar pyrolysis reactor configured to heat a biomass feedstock to cause a pyrolysis reaction of the biomass feedstock using heat from the exhaust gas to generate a biochar and a syngas.

The system of the preceding clause, wherein the biochar pyrolysis reactor is configured to heat the biomass feedstock via a direct heat transfer from the exhaust gas to the biomass feedstock.

The system of any preceding clause, wherein the biochar pyrolysis reactor is configured to output a mixture of the syngas and the exhaust gas.

The system of any preceding clause, comprising a duct burner configured to burn the syngas in the mixture to heat the exhaust gas.

The system of any preceding clause, including a steam generator downstream from the duct burner, wherein the steam generator is configured to generate steam using heat from the exhaust gas.

The system of any preceding clause, including a steam turbine system driven by the steam from the steam generator.

The system of any preceding clause, including a nitrogen selective membrane configured to separate nitrogen and the syngas from the exhaust gas.

The system of any preceding clause, including a fuel supply system configured to supply the syngas from the nitrogen selective membrane to the combustor of the gas turbine system.

The system of any preceding clause, wherein the fuel supply system includes a heat exchanger configured to cool the syngas, a compressor configured to compress the syngas, a tank configured to store the syngas, or a combination thereof.

The system of any preceding clause, wherein the biochar pyrolysis reactor includes a conveyor configured to move the biomass feedstock undergoing the pyrolysis reaction.

The system of any preceding clause, including a biochar sorbent system configured to adsorb an undesirable gas from the exhaust gas into the biochar to generate a treated gas and an enriched biochar.

The system of any preceding clause, wherein the undesirable gas includes nitrogen oxides and the enriched biochar includes a nitrogen-rich biochar.

The system of any preceding clause, wherein the biochar is configured to support one or more soil applications.

A method includes combusting fuel with oxidant in a substantially stoichiometric equivalence ratio, phi ($\phi$), of between 0.95 to 1.05 in a combustor of a gas turbine system, wherein the gas turbine system includes a compressor, the combustor, and a turbine. The method further includes recirculating an exhaust gas from the turbine to an intake into the compressor via an exhaust gas recirculation (EGR) system. The method further includes heating a biomass feedstock in a biochar pyrolysis reactor to cause a pyrolysis reaction of the biomass feedstock using heat from the exhaust gas to generate a biochar and a syngas.

The method of the preceding clause, including heating the biomass feedstock via a direct heat transfer from the exhaust gas to the biomass feedstock, and outputting a mixture of the syngas and the exhaust gas from the biochar pyrolysis reactor.

The method of any preceding clause, including burning the syngas in the mixture to heat the exhaust gas via a duct burner, and generating steam using heat from the exhaust gas in a steam generator downstream from the duct burner.

The method of any preceding clause, including separating nitrogen and the syngas from the exhaust gas via a nitrogen selective membrane.

The method of any preceding clause, including adsorbing an undesirable gas from the exhaust gas into the biochar to generate a treated gas and an enriched biochar via a biochar sorbent system, wherein the undesirable gas includes nitrogen oxides and the enriched biochar includes a nitrogen-rich biochar, wherein the biochar is configured to support one or more soil applications.

A system includes a controller having a processor, a memory, and instructions stored on the memory and executable by the processor to control combustion of fuel with oxidant in a substantially stoichiometric equivalence ratio, phi ($\phi$), of between 0.95 to 1.05 in a combustor of a gas turbine system, wherein the gas turbine system includes a compressor, the combustor, and a turbine. The controller is further configured to control recirculation of an exhaust gas from the turbine to an intake into the compressor via an exhaust gas recirculation (EGR) system. The controller is further configured to control heating of a biomass feedstock in a biochar pyrolysis reactor to cause a pyrolysis reaction of the biomass feedstock using heat from the exhaust gas to generate a biochar and a syngas.

The system of the preceding clause, wherein the controller is configured to control adsorption of an undesirable gas from the exhaust gas into the biochar to generate a treated gas and an enriched biochar via a biochar sorbent system, wherein the undesirable gas includes nitrogen oxides and the enriched biochar includes a nitrogen-rich biochar, wherein the biochar is configured to support one or more soil applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gas turbine system having a compressor, a combustor, and a turbine, wherein the combustor is configured to combust fuel and oxidant in a substantially stoichiometric equivalence ratio, phi ($\phi$), of between 0.95 to 1.05;
   an exhaust gas recirculation (EGR) system configured to recirculate an exhaust gas from the turbine to an intake into the compressor; and
   a biochar pyrolysis reactor configured to heat a biomass feedstock to cause a pyrolysis reaction of the biomass feedstock using heat from the exhaust gas to generate a biochar and a syngas, wherein the system comprises at least one of:
   a duct burner configured to burn the syngas in a mixture of the syngas and the exhaust gas output by the biochar pyrolysis reactor to heat the exhaust gas;
   a nitrogen selective membrane configured to separate nitrogen and the syngas from the exhaust gas in the mixture of the syngas and the exhaust gas output by the biochar pyrolysis reactor; or
   a biochar sorbent system configured to adsorb an undesirable gas from the exhaust gas into the biochar to generate a treated gas and an enriched biochar;
   or a combination thereof.

2. The system of claim 1, wherein the biochar pyrolysis reactor is configured to heat the biomass feedstock via a direct heat transfer from the exhaust gas to the biomass feedstock.

3. The system of claim 2, wherein the biochar pyrolysis reactor is configured to output the mixture of the syngas and the exhaust gas.

4. The system of claim 3, comprising the duct burner configured to burn the syngas in the mixture to heat the exhaust gas.

5. The system of claim 4, comprising a steam generator downstream from the duct burner, wherein the steam generator is configured to generate steam using heat from the exhaust gas.

6. The system of claim 5, comprising a steam turbine system driven by the steam from the steam generator.

7. The system of claim 3, comprising the nitrogen selective membrane configured to separate the nitrogen and the syngas from the exhaust gas.

8. The system of claim 7, comprising a fuel supply system configured to supply the syngas from the nitrogen selective membrane to the combustor of the gas turbine system.

9. The system of claim 8, wherein the fuel supply system comprises a heat exchanger configured to cool the syngas, a compressor configured to compress the syngas, a tank configured to store the syngas, or a combination thereof.

10. The system of claim 1, wherein the biochar pyrolysis reactor comprises a conveyor configured to move the biomass feedstock undergoing the pyrolysis reaction.

11. The system of claim 1, comprising the biochar sorbent system configured to adsorb the undesirable gas from the exhaust gas into the biochar to generate the treated gas and the enriched biochar.

12. The system of claim 11, wherein the undesirable gas comprises nitrogen oxides and the enriched biochar comprises a nitrogen-rich biochar.

13. The system of claim 12, wherein the biochar is configured to support one or more soil applications.

14. A method, comprising:
   combusting fuel with oxidant in a substantially stoichiometric equivalence ratio, phi ($\phi$), of between 0.95 to 1.05 in a combustor of a gas turbine system, wherein the gas turbine system comprises a compressor, the combustor, and a turbine;
   recirculating an exhaust gas from the turbine to an intake into the compressor via an exhaust gas recirculation (EGR) system; and
   heating a biomass feedstock in a biochar pyrolysis reactor to cause a pyrolysis reaction of the biomass feedstock using heat from the exhaust gas to generate a biochar and a syngas, wherein the method comprises at least one of:
      burning the syngas in a mixture of the syngas and the exhaust gas output by the biochar pyrolysis reactor to heat the exhaust gas via a duct burner
      separating nitrogen and the syngas from the exhaust gas in the mixture of the syngas and the exhaust gas output by the biochar pyrolysis reactor via a nitrogen selective membrane; or
      adsorbing an undesirable gas from the exhaust gas into the biochar to generate a treated gas and an enriched biochar via a biochar sorbent system;
      or a combination thereof.

15. The method of claim 14, comprising heating the biomass feedstock via a direct heat transfer from the exhaust gas to the biomass feedstock, and outputting the mixture of the syngas and the exhaust gas from the biochar pyrolysis reactor.

16. The method of claim 15, comprising burning the syngas in the mixture to heat the exhaust gas via the duct burner, and generating steam using heat from the exhaust gas in a steam generator downstream from the duct burner.

17. The method of claim 15, comprising separating the nitrogen and the syngas from the exhaust gas via the nitrogen selective membrane.

18. The method of claim 14, comprising adsorbing the undesirable gas from the exhaust gas into the biochar to generate the treated gas and the enriched biochar via the biochar sorbent system, wherein the undesirable gas comprises nitrogen oxides and the enriched biochar comprises a nitrogen-rich biochar, wherein the biochar is configured to support one or more soil applications.

19. A system, comprising:
   a controller having a processor, a memory, and instructions stored on the memory and executable by the processor to:
      control combustion of fuel with oxidant in a substantially stoichiometric equivalence ratio, phi ($\phi$), of between 0.95 to 1.05 in a combustor of a gas turbine system, wherein the gas turbine system comprises a compressor, the combustor, and a turbine;
      control recirculation of an exhaust gas from the turbine to an intake into the compressor via an exhaust gas recirculation (EGR) system;
      control heating of a biomass feedstock in a biochar pyrolysis reactor to cause a pyrolysis reaction of the biomass feedstock using heat from the exhaust gas to generate a biochar and a syngas, wherein the controller is further configured to control at least one of:
         burning the syngas in a mixture of the syngas and the exhaust gas output by the biochar pyrolysis reactor to heat the exhaust gas via a duct burner
         separating nitrogen and the syngas from the exhaust gas in the mixture of the syngas and the exhaust gas output by the biochar pyrolysis reactor via a nitrogen selective membrane; or
         adsorbing an undesirable gas from the exhaust gas into the biochar to generate a treated gas and an enriched biochar via a biochar sorbent system;
         or a combination thereof.

20. The system of claim 19, wherein the controller is configured to control adsorbing the undesirable gas from the exhaust gas into the biochar to generate the treated gas and the enriched biochar via the biochar sorbent system, wherein the undesirable gas comprises nitrogen oxides and the enriched biochar comprises a nitrogen-rich biochar, wherein the biochar is configured to support one or more soil applications.

21. The system of claim 19, wherein the controller is configured to control burning the syngas in the mixture of the syngas and the exhaust gas output by the biochar pyrolysis reactor to A heat the exhaust gas via the duct burner.

22. The system of claim 19, wherein the controller is configured to control separating the nitrogen and the syngas from the exhaust gas in the mixture of the syngas and the exhaust gas output by the biochar pyrolysis reactor via the nitrogen selective membrane.

* * * * *